United States Patent
Ao et al.

(10) Patent No.: US 11,249,788 B2
(45) Date of Patent: Feb. 15, 2022

(54) CLOUD MANAGEMENT PLATFORM, AND VIRTUAL MACHINE MANAGEMENT METHOD AND SYSTEM

(71) Applicant: Huawei Technologies Co., Ltd., Shenzhen (CN)

(72) Inventors: Hongwei Ao, Hangzhou (CN); Yaobin Wang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 276 days.

(21) Appl. No.: 16/600,923

(22) Filed: Oct. 14, 2019

(65) Prior Publication Data
US 2020/0042344 A1 Feb. 6, 2020

Related U.S. Application Data

(63) Continuation of application No. PCT/CN2018/083334, filed on Apr. 17, 2018.

(30) Foreign Application Priority Data

Apr. 17, 2017 (WO) ................ PCT/CN2017/080812

(51) Int. Cl.
*G06F 9/455* (2018.01)
*H04L 29/08* (2006.01)

(52) U.S. Cl.
CPC ............ *G06F 9/45558* (2013.01); *G06F 2009/45562* (2013.01); *H04L 67/10* (2013.01)

(58) Field of Classification Search
CPC ......... G06F 2009/4557; G06F 9/45558; G06F 2009/45562; G06F 9/44505; H04L 67/10
See application file for complete search history.

(56) References Cited

U.S. PATENT DOCUMENTS 8,429,675 B1 * 4/2013 Radhakrishnan ... G06F 9/45558
719/319
9,225,661 B1 * 12/2015 Yang .................. H04L 67/1002
(Continued)

FOREIGN PATENT DOCUMENTS

| CN | 103034527 A | 4/2013 |
| CN | 103092670 A | 5/2013 |

(Continued)

OTHER PUBLICATIONS

Machine Translation and Abstract of Chinese Publication No. CN103092670, May 8, 2013, 11 pages.
(Continued)

*Primary Examiner* — Frantz B Jean
(74) *Attorney, Agent, or Firm* — Conley Rose, P.C.

(57) ABSTRACT

A cloud management platform, and a virtual machine management method and system, where the virtual machine management method includes: obtaining, by a first cloud management platform, configuration information of an inventory virtual machine from a second cloud management platform; locally creating, by the first cloud management platform, a proxy virtual machine according to the configuration information of the inventory virtual machine; generating a proxy virtual machine identification code according to the configuration information of the inventory virtual machine; sending, by the first cloud management platform, the proxy virtual machine identification code to the second cloud management platform; and updating, by the second cloud management platform to the proxy virtual machine identification code, an inventory virtual machine identification code recorded by the second cloud management platform.

20 Claims, 15 Drawing Sheets

(56) References Cited

U.S. PATENT DOCUMENTS

| | | | |
|---|---|---|---|
| 10,055,309 B1* | 8/2018 | Samad | G06F 11/1464 |
| 2009/0216816 A1* | 8/2009 | Basler | G06F 11/1464 |
| 2016/0011894 A1 | 1/2016 | Reddy et al. | |
| 2017/0060628 A1 | 3/2017 | Tarasuk-Levin et al. | |
| 2017/0083358 A1 | 3/2017 | Zada et al. | |

FOREIGN PATENT DOCUMENTS

| | | |
|---|---|---|
| CN | 103092676 A | 5/2013 |
| CN | 103200215 A | 7/2013 |
| CN | 103297514 A | 9/2013 |
| CN | 103516802 A | 1/2014 |
| CN | 104111863 A | 10/2014 |
| CN | 104484221 A | 4/2015 |
| CN | 105262625 A | 1/2016 |
| CN | 105577442 A | 5/2016 |
| CN | 105635311 A | 6/2016 |
| CN | 105978828 A | 9/2016 |
| CN | 106371962 A | 2/2017 |
| WO | 2007071116 A1 | 6/2007 |

OTHER PUBLICATIONS

Machine Translation and Abstract of Chinese Publication No. CN103092676, May 8, 2013, 24 pages.
Machine Translation and Abstract of Chinese Publication No. CN103200215, Jul. 10, 2013, 7 pages.
Machine Translation and Abstract of Chinese Publication No. CN103297514, Sep. 11, 2013, 7 pages.
Machine Translation and Abstract of Chinese Publication No. CN105262625, Jan. 20, 2016, 23 pages.
Machine Translation and Abstract of Chinese Publication No. CN105577442, May 11, 2016, 9 pages.
Machine Translation and Abstract of Chinese Publication No. CN105635311, Jun. 1, 2016, 9 pages.
Machine Translation and Abstract of Chinese Publication No. CN105978828, Sep. 28, 2016, 23 pages.
Machine Translation and Abstract of Chinese Publication No. CN106371962, Feb. 1, 2017, 17 pages.
Foreign Communication From a Counterpart Application, PCT Application No. PCT/CN2017/080812, English Translation of International Search Report dated Oct. 26, 2017, 2 pages.
Foreign Communication From a Counterpart Application, PCT Application No. PCT/CN2017/080812, English Translation of Written Opinion dated Oct. 26, 2017, 5 pages.
Foreign Communication From a Counterpart Application, PCT Application No. PCT/CN2018/083334, English Translation of International Search Report dated Jul. 18, 2018, 2 pages.
Foreign Communication From a Counterpart Application, PCT Application No. PCT/CN2018/083334, English Translation of Written Opinion dated Jul. 18, 2018, 5 pages.

* cited by examiner

CLOUD MANAGEMENT PLATFORM, AND VIRTUAL MACHINE MANAGEMENT METHOD AND SYSTEM

CROSS-REFERENCE TO RELATED APPLICATIONS

This application is a continuation of International Patent Application No. PCT/CN2018/083334 filed on Apr. 17, 2018, which claims priority to International Patent Application No. PCT/CN2017/080812, filed on Apr. 17, 2017, which are incorporated by reference in their entireties.

TECHNICAL FIELD

This application relates to the field of cloud computing technologies, and in particular, to a cloud management platform, and a virtual machine management method and system.

BACKGROUND

In a cloud computing scenario, with emergence of virtual machine technologies, a cloud service is applied on a large scale, and a large quantity of clients continuously relocate infrastructures to cloud. To meet increasing requirements of the clients for the cloud service, a cloud service provider continuously adds servers to a resource pool to support normal running of the cloud service, and virtual machines are disposed on the servers to provide the cloud service.

In other approaches, different types of cloud management platforms are provided, for example, an OpenStack platform of an open source community, a VMware vSphere platform of VMware, and a FusionSphere platform of Huawei. A cloud management platform is used to manage a virtual machine, and specifically, may perform operations such as creating, deleting, startup, shutdown, hibernation, wakeup, suspension, restart, and migration on the virtual machine.

Generally, each type of cloud management platform can manage only an inventory virtual machine created by the cloud management platform, but does not support cross-platform management on a virtual machine on another type of cloud management platform. For example, the OpenStack platform cannot manage an inventory virtual machine created by the VMware vSphere platform.

When cross-platform virtual machine management needs to be performed, for example, when a virtual machine created by the VMware vSphere platform needs to be set to enter a state in which the virtual machine can be managed by the OpenStack platform, a current implementation in the industry is that a managed platform provides an interface for querying each resource model, to obtain required attribute information (for example, a virtual machine Universally Unique Identifier (UUID), a virtual machine name, a volume UUID, a volume name, a port group name, an association relationship between the virtual machine and a disk, and an association relationship between the virtual machine and a network adapter).

A model of a cloud management platform includes various entries, and the entries record attribute information of a virtual machine. Because there is a relatively large difference between designs of models of different types of cloud management platforms, entries of the models of the different types of cloud management platforms are not in a one-to-one correspondence, but in a one-to-many mapping relationship, a many-to-one mapping relationship, or a many-to-many mapping relationship. For example, a virtual machine on the OpenStack platform corresponds to entries: instances, instance_type, instance_metadata, instance_system_metadata, instance_info_cache, and instance_extra, but a virtual machine on the VMware vSphere platform corresponds to only one entry: tbl_vm.

Therefore, to implement cross-platform virtual machine management, in other approaches, code needs to be manually viewed to extract a mapping relationship between entries of different types of cloud management platforms. This solution is relatively complex.

SUMMARY

This application discloses a cloud management platform, and a virtual machine management method and system, to support cross-platform automated management on a virtual machine.

According to a first aspect, this application provides a virtual machine management method. The method includes the following steps. A first cloud management platform obtains configuration information of an inventory virtual machine from a second cloud management platform. The first cloud management platform and the second cloud management platform are different types of cloud management platforms. The first cloud management platform locally creates a proxy virtual machine according to the configuration information of the inventory virtual machine, and generates a proxy virtual machine identification code according to the configuration information of the inventory virtual machine. The proxy virtual machine identification code is used to identify the created proxy virtual machine on the first cloud management platform. The first cloud management platform sends the proxy virtual machine identification code to the second cloud management platform. The second cloud management platform updates, to the proxy virtual machine identification code, an inventory virtual machine identification code recorded by the second cloud management platform.

The first cloud management platform creates the proxy virtual machine and the proxy virtual machine identification code according to the configuration information obtained from the second cloud management platform, and sends the proxy virtual machine identification code to the second cloud management platform, such that the second cloud management platform updates the inventory virtual machine identification code to the proxy virtual machine identification code. During subsequent maintenance, only the proxy virtual machine identification code and a corresponding management command need to be entered on the first cloud management platform, and the first cloud management platform sends the proxy virtual machine identification code and the corresponding management command to the second cloud management platform, such that the first cloud management platform can manage the inventory virtual machine managed by the second cloud management platform. Therefore, cross-platform automated management on a virtual machine can be implemented.

In an implementation of this application, the step that the first cloud management platform locally creates a proxy virtual machine according to the configuration information of the inventory virtual machine, and generates a proxy virtual machine identification code according to the configuration information of the inventory virtual machine includes the following substeps. First, the first cloud management platform creates a proxy network resource, and generates a proxy network resource identification code used to identify the proxy network resource on the first cloud management platform. Then, the first cloud management platform creates a proxy storage resource, and generates a proxy storage resource identification code used to identify the proxy storage resource on the first cloud management platform. It should be noted that, a sequence of creating the network resource and the storage resource may be adjusted according to a requirement. The virtual machine can be created according to the network resource and the storage resource only after the network resource and the storage resource are created. A virtual machine association module queries, on the second cloud management platform, a hardware configuration and the inventory virtual machine identification code of the inventory virtual machine that are recorded by the second cloud management platform. The inventory virtual machine identification code is used to identify the inventory virtual machine on the second cloud management platform. The virtual machine association module sends the hardware configuration and the inventory virtual machine identification code to the first cloud management platform. According to the hardware configuration, the proxy network resource identification code, and the proxy storage resource identification code, the first cloud management platform creates the proxy virtual machine, and generates the proxy virtual machine identification code.

The first cloud management platform in this application uses an OpenStack architecture, and integrates a network resource, a storage resource, and a hardware configuration to create a virtual machine. Therefore, the first cloud management platform needs to first create the proxy network resource and the proxy storage resource, and then integrate the proxy network resource and the proxy storage resource with the queried hardware configuration, to create the proxy virtual machine.

In another implementation of this application, the first cloud management platform sends both the proxy virtual machine identification code and the inventory virtual machine identification code to the second cloud management platform.

When more than one virtual machine needs to be taken over, the first cloud management platform sends both the proxy virtual machine identification code and the inventory virtual machine identification code to the second cloud management platform. The second cloud management platform may search, according to the received inventory virtual machine identification code, for the inventory virtual machine identification code stored by the second cloud management platform, and update, to the proxy virtual machine identification code corresponding to the received inventory virtual machine identification code, the inventory virtual machine identification code stored by the second cloud management platform.

In another implementation of this application, the configuration information further includes a network configuration and an inventory network resource identification code of an inventory network resource of the inventory virtual machine, and that the first cloud management platform creates a proxy network resource, and generates a proxy network resource identification code used to identify the proxy network resource on the first cloud management platform is implemented in the following manner. The virtual machine association module queries, on the second cloud management platform, the network configuration and the inventory network resource identification code of the inventory network resource of the inventory virtual machine that are recorded by the second cloud management platform. The virtual machine association module may be disposed as a component of the first cloud management platform, or may be independent of the first cloud management platform and the second cloud management platform. In addition, the inventory network resource identification code is used to identify the inventory network resource of the inventory virtual machine on the second cloud management platform. The virtual machine association module sends the network configuration and the inventory network resource identification code to the first cloud management platform. The first cloud management platform creates the proxy network resource according to the network configuration, and generates the proxy network resource identification code according to the network configuration. The first cloud management platform sends the proxy network resource identification code and the inventory network resource identification code to the second cloud management platform. The second cloud management platform updates, to the proxy network resource identification code, the inventory network resource identification code recorded by the second cloud management platform.

The first cloud management platform takes over the inventory network resource of the second cloud management platform, such that the created proxy virtual machine can have a network configuration consistent with that of the inventory virtual machine. In addition, when the virtual machine association module is independent of the first cloud management platform and the second cloud management platform, modification to the first cloud management platform and the second cloud management platform can be avoided.

In another implementation of this application, the configuration information further includes a storage configuration and an inventory storage resource identification code of an inventory storage resource of the inventory virtual machine, and that the first cloud management platform creates a proxy storage resource, and generates a proxy storage resource identification code used to identify the proxy storage resource is implemented in the following manner. The virtual machine association module queries, on the second cloud management platform, the storage configuration and the inventory storage resource identification code of the inventory storage resource of the inventory virtual machine that are recorded by the second cloud management platform. The inventory storage resource identification code is used to identify the inventory storage resource of the inventory virtual machine on the second cloud management platform. The virtual machine association module sends the storage configuration and the inventory storage resource identification code to the first cloud management platform. The first cloud management platform creates the proxy storage resource according to the storage configuration, and generates the proxy storage resource identification code according to the storage configuration. The first cloud management platform sends the proxy storage resource identification code and the inventory storage resource identification code to the second cloud management platform. The second cloud management platform updates, to the proxy storage resource identification code, the inventory storage resource identification code recorded by the second cloud management platform.

The first cloud management platform takes over the inventory storage resource of the second cloud management platform, such that the created proxy virtual machine can have a storage configuration consistent with that of the inventory virtual machine.

In another implementation of this application, the first cloud management platform provides a user interaction interface, and receives, from the user interaction interface, a virtual machine management command for performing management according to a virtual machine identification code. The first cloud management platform sends the virtual machine management command to the second cloud management platform when the first cloud management platform determines that the virtual machine identification code is the proxy virtual machine identification code. The virtual machine management command carries the proxy virtual machine identification code. The second cloud management platform receives the virtual machine management command, and manages the inventory virtual machine corresponding to the proxy virtual machine identification code.

Because the inventory virtual machine identification code of the second cloud management platform has been updated to the proxy virtual machine identification code created by the first cloud management platform, the first cloud management platform needs to forward, to the second cloud management platform, only the management command for performing management according to the proxy virtual machine identification code, and the second cloud management platform manages, according to the received proxy virtual machine identification code, the virtual machine corresponding to the proxy virtual machine identification code stored by the second cloud management platform, such that cross-platform management on the inventory virtual machine can be implemented.

In another implementation of this application, the hardware configuration includes a clock rate of a processor, a quantity of processors, and a memory capacity, the storage configuration includes a volume Universally Unique Identifier (UUID), a volume name, and a volume size, and the network configuration includes a port group Identifier (ID), a virtual local area network ID, a port ID, an IP address, a medium access control (MAC) address, a subnet ID, and a Classless Inter-Domain Routing (CIDR) network segment.

According to a second aspect, this application provides a virtual machine management system. The system includes a first cloud management platform and a second cloud management platform. The first cloud management platform is configured to obtain configuration information of an inventory virtual machine from the second cloud management platform. The first cloud management platform and the second cloud management platform are different types of cloud management platforms. The first cloud management platform is further configured to: locally create a proxy virtual machine according to the configuration information of the inventory virtual machine; and generate a proxy virtual machine identification code according to the configuration information of the inventory virtual machine. The proxy virtual machine identification code is used to identify the created proxy virtual machine on the first cloud management platform. In addition, the first cloud management platform is further configured to send the proxy virtual machine identification code to the second cloud management platform. The second cloud management platform is configured to update, to the proxy virtual machine identification code, an inventory virtual machine identification code recorded by the second cloud management platform.

The second aspect or any implementation of the second aspect is a system implementation corresponding to the first aspect or any implementation of the first aspect. A description in the first aspect or any implementation of the first aspect is applicable to the second aspect or any implementation of the second aspect. Details are not described herein again.

According to a third aspect, this application provides a virtual machine management method, including the following steps. A first cloud management platform obtains configuration information of an inventory virtual machine from a second cloud management platform. The first cloud management platform and the second cloud management platform are different types of cloud management platforms. The first cloud management platform locally creates a proxy virtual machine according to the configuration information of the inventory virtual machine, and generates a proxy virtual machine identification code according to the configuration information of the inventory virtual machine. The proxy virtual machine identification code is used to identify the created proxy virtual machine on the first cloud management platform. The first cloud management platform sends the proxy virtual machine identification code to the second cloud management platform.

The first cloud management platform creates the proxy virtual machine and the proxy virtual machine identification code according to the configuration information obtained from the second cloud management platform, and sends the proxy virtual machine identification code to the second cloud management platform, such that the second cloud management platform updates an inventory virtual machine identification code to the proxy virtual machine identification code. During subsequent maintenance, only the proxy virtual machine identification code and a corresponding management command need to be entered on the first cloud management platform, and the first cloud management platform sends the proxy virtual machine identification code and the corresponding management command to the second cloud management platform, such that the first cloud management platform can manage the inventory virtual machine managed by the second cloud management platform. Therefore, cross-platform automated management on a virtual machine can be implemented.

According to a fourth aspect, this application provides a cloud management platform. The platform includes a virtual machine association module and a computing module. The virtual machine association module is configured to obtain configuration information of an inventory virtual machine from another cloud management platform. The cloud management platform and the other cloud management platform are different types of cloud management platforms. The computing module is configured to: locally create a proxy virtual machine according to the configuration information of the inventory virtual machine; and generate a proxy virtual machine identification code according to the configuration information of the inventory virtual machine; and send the proxy virtual machine identification code to the other cloud management platform. The proxy virtual machine identification code is used to identify the created proxy virtual machine on the cloud management platform.

The fourth aspect or any implementation of the fourth aspect is a platform implementation corresponding to the third aspect or any implementation of the third aspect. A description in the third aspect or any implementation of the third aspect is applicable to the fourth aspect or any implementation of the fourth aspect. Details are not described herein again.

According to a fifth aspect, this application provides a host, including a processor, a memory, and a bus. Both the processor and the memory are connected to the bus, the memory stores a program instruction, and the processor executes the program instruction to perform the method described in the first aspect.

According to a sixth aspect, this application provides a virtual machine management method. The method includes the following steps. A first cloud management platform obtains configuration information of an inventory virtual machine from a second cloud management platform. The first cloud management platform and the second cloud management platform are different types of cloud management platforms. The first cloud management platform locally creates a proxy virtual machine according to the configuration information of the inventory virtual machine, and generates a proxy virtual machine identification code according to the configuration information of the inventory virtual machine. The proxy virtual machine identification code is used to identify the created proxy virtual machine on the first cloud management platform. The first cloud management platform sends the proxy virtual machine identification code to the second cloud management platform. The second cloud management platform records a relationship between the inventory virtual machine identification code recorded by the second cloud management platform and the proxy virtual machine identification code.

The first cloud management platform creates the proxy virtual machine and the proxy virtual machine identification code according to the configuration information obtained from the second cloud management platform, and sends the proxy virtual machine identification code to the second cloud management platform, such that the second cloud management platform records the relationship between the inventory virtual machine identification code and the proxy virtual machine identification code. During subsequent maintenance, only the proxy virtual machine identification code and a corresponding management command need to be entered on the first cloud management platform, and the first cloud management platform sends the proxy virtual machine identification code and the corresponding management command to the second cloud management platform, such that the first cloud management platform can manage the inventory virtual machine managed by the second cloud management platform. Therefore, cross-platform automated management on a virtual machine can be implemented.

In an implementation of this application, the step that the first cloud management platform locally creates a proxy virtual machine according to the configuration information of the inventory virtual machine, and generates a proxy virtual machine identification code according to the configuration information of the inventory virtual machine includes the following sub steps. First, the first cloud management platform creates a proxy network resource, and generates a proxy network resource identification code used to identify the proxy network resource on the first cloud management platform. Then, the first cloud management platform creates a proxy storage resource, and generates a proxy storage resource identification code used to identify the proxy storage resource on the first cloud management platform. It should be noted that, a sequence of creating the network resource and the storage resource may be adjusted according to a requirement. The virtual machine can be created according to the network resource and the storage resource only after the network resource and the storage resource are created. A virtual machine association module queries, on the second cloud management platform, a hardware configuration and the inventory virtual machine identification code of the inventory virtual machine that are recorded by the second cloud management platform. The inventory virtual machine identification code is used to identify the inventory virtual machine on the second cloud management platform. The virtual machine association module sends the hardware configuration and the inventory virtual machine identification code to the first cloud management platform. According to the hardware configuration, the proxy network resource identification code, and the proxy storage resource identification code, the first cloud management platform creates the proxy virtual machine, and generates the proxy virtual machine identification code.

The first cloud management platform in this application uses an OpenStack architecture, and integrates a network resource, a storage resource, and a hardware configuration to create a virtual machine. Therefore, the first cloud management platform needs to first create the proxy network resource and the proxy storage resource, and then integrate the proxy network resource and the proxy storage resource with the queried hardware configuration, to create the proxy virtual machine.

In another implementation of this application, the first cloud management platform sends both the proxy virtual machine identification code and the inventory virtual machine identification code to the second cloud management platform.

When more than one virtual machine needs to be taken over, the first cloud management platform sends both the proxy virtual machine identification code and the inventory virtual machine identification code to the second cloud management platform. The second cloud management platform may search, according to the received inventory virtual machine identification code, for the inventory virtual machine identification code stored by the second management platform, and update, to the proxy virtual machine identification code corresponding to the received inventory virtual machine identification code, the inventory virtual machine identification code stored by the second management platform, records a relationship between the inventory virtual machine identification code recorded by the second cloud management platform and the proxy virtual machine identification code.

In another implementation of this application, the configuration information further includes a network configuration and an inventory network resource identification code of an inventory network resource of the inventory virtual machine, and that the first cloud management platform creates a proxy network resource, and generates a proxy network resource identification code used to identify the proxy network resource on the first cloud management platform is implemented in the following manner. The virtual machine association module queries, on the second cloud management platform, the network configuration and the inventory network resource identification code of the inventory network resource of the inventory virtual machine that are recorded by the second cloud management platform. For example, the virtual machine association module may be disposed as a component of the first cloud management platform, or may be independent of the first cloud management platform and the second cloud management platform. In addition, the inventory network resource identification code is used to identify the inventory network resource of the inventory virtual machine on the second cloud management platform. The virtual machine association module sends the network configuration and the inventory network resource identification code to the first cloud management platform. The first cloud management platform creates the proxy network resource according to the network configuration, and generates the proxy network resource identification code according to the network configuration. The first cloud management platform sends the proxy network resource identification code and the inventory network resource identification code to the second cloud management platform. The second cloud management platform records a relationship between the proxy network resource identification code and the inventory network resource identification code.

The first cloud management platform takes over the inventory network resource of the second cloud management platform, such that the created proxy virtual machine can have a network configuration consistent with that of the inventory virtual machine. In addition, when the virtual machine association module is independent of the first cloud management platform and the second cloud management platform, modification to the first cloud management platform and the second cloud management platform can be avoided.

In another implementation of this application, the configuration information further includes a storage configuration and an inventory storage resource identification code of an inventory storage resource of the inventory virtual machine, and that the first cloud management platform creates a proxy storage resource, and generates a proxy storage resource identification code used to identify the proxy storage resource is implemented in the following manner. The virtual machine association module queries, on the second cloud management platform, the storage configuration and the inventory storage resource identification code of the inventory storage resource of the inventory virtual machine that are recorded by the second cloud management platform. The inventory storage resource identification code is used to identify the inventory storage resource of the inventory virtual machine on the second cloud management platform. The virtual machine association module sends the storage configuration and the inventory storage resource identification code to the first cloud management platform. The first cloud management platform creates the proxy storage resource according to the storage configuration, and generates the proxy storage resource identification code according to the storage configuration. The first cloud management platform sends the proxy storage resource identification code and the inventory storage resource identification code to the second cloud management platform. The second cloud management platform records a relationship between the proxy storage resource identification code and the inventory storage resource identification code.

The first cloud management platform takes over the inventory storage resource of the second cloud management platform, such that the created proxy virtual machine can have a storage configuration consistent with that of the inventory virtual machine.

In another implementation of this application, the first cloud management platform provides a user interaction interface, and receives, from the user interaction interface, a virtual machine management command for performing management according to a virtual machine identification code. The first cloud management platform sends the virtual machine management command to the second cloud management platform when the first cloud management platform determines that the virtual machine identification code is the proxy virtual machine identification code. For example, the virtual machine management command carries the proxy virtual machine identification code. The second cloud management platform receives the virtual machine management command, and manages the inventory virtual machine corresponding to the proxy virtual machine identification code.

Because the inventory virtual machine identification code of the second cloud management platform has been updated to the proxy virtual machine identification code created by the first cloud management platform, the first cloud management platform needs to forward, to the second cloud management platform, only the management command for performing management according to the proxy virtual machine identification code, and the second cloud management platform manages, according to the received proxy virtual machine identification code, the virtual machine corresponding to the proxy virtual machine identification code stored by the second cloud management platform, such that cross-platform management on the inventory virtual machine can be implemented.

According to a seventh aspect, this application provides a virtual machine management system. The system includes a first cloud management platform and a second cloud management platform. The first cloud management platform is configured to obtain configuration information of an inventory virtual machine from the second cloud management platform. The first cloud management platform and the second cloud management platform are different types of cloud management platforms. The first cloud management platform is further configured to: locally create a proxy virtual machine according to the configuration information of the inventory virtual machine; and generate a proxy virtual machine identification code according to the configuration information of the inventory virtual machine. The proxy virtual machine identification code is used to identify the created proxy virtual machine on the first cloud management platform. In addition, the first cloud management platform is further configured to send the proxy virtual machine identification code to the second cloud management platform. The second cloud management platform records a relationship between the inventory virtual machine identification code and the proxy virtual machine identification code.

The seventh aspect or any implementation of the seventh aspect is a system implementation corresponding to the sixth aspect or any implementation of the sixth aspect. A description in the sixth aspect or any implementation of the sixth aspect is applicable to the seventh aspect or any implementation of the seventh aspect. Details are not described herein again.

DESCRIPTION OF EMBODIMENTS

The technical solutions in embodiments of the present disclosure are clearly and completely described in the following with reference to the accompanying drawings.

It should be noted that, in the embodiments of the present disclosure, a first cloud management platform includes but is not limited to an OpenStack platform, a vCloudStack platform, a FusionSphere platform, a VMware vSphere platform, a KVM platform, and a Citrix platform. A second cloud management platform includes but is not limited to the OpenStack platform, the vCloudStack platform, the FusionSphere platform, the VMware vSphere platform, the KVM platform, and the Citrix platform. For ease of description, in the embodiments of the present disclosure, the OpenStack platform is used as the first cloud management platform, and the VMware vSphere platform is used as the second cloud management platform, to provide a description. The first cloud management platform and the second cloud management platform are different types of platforms.

Figure 1:
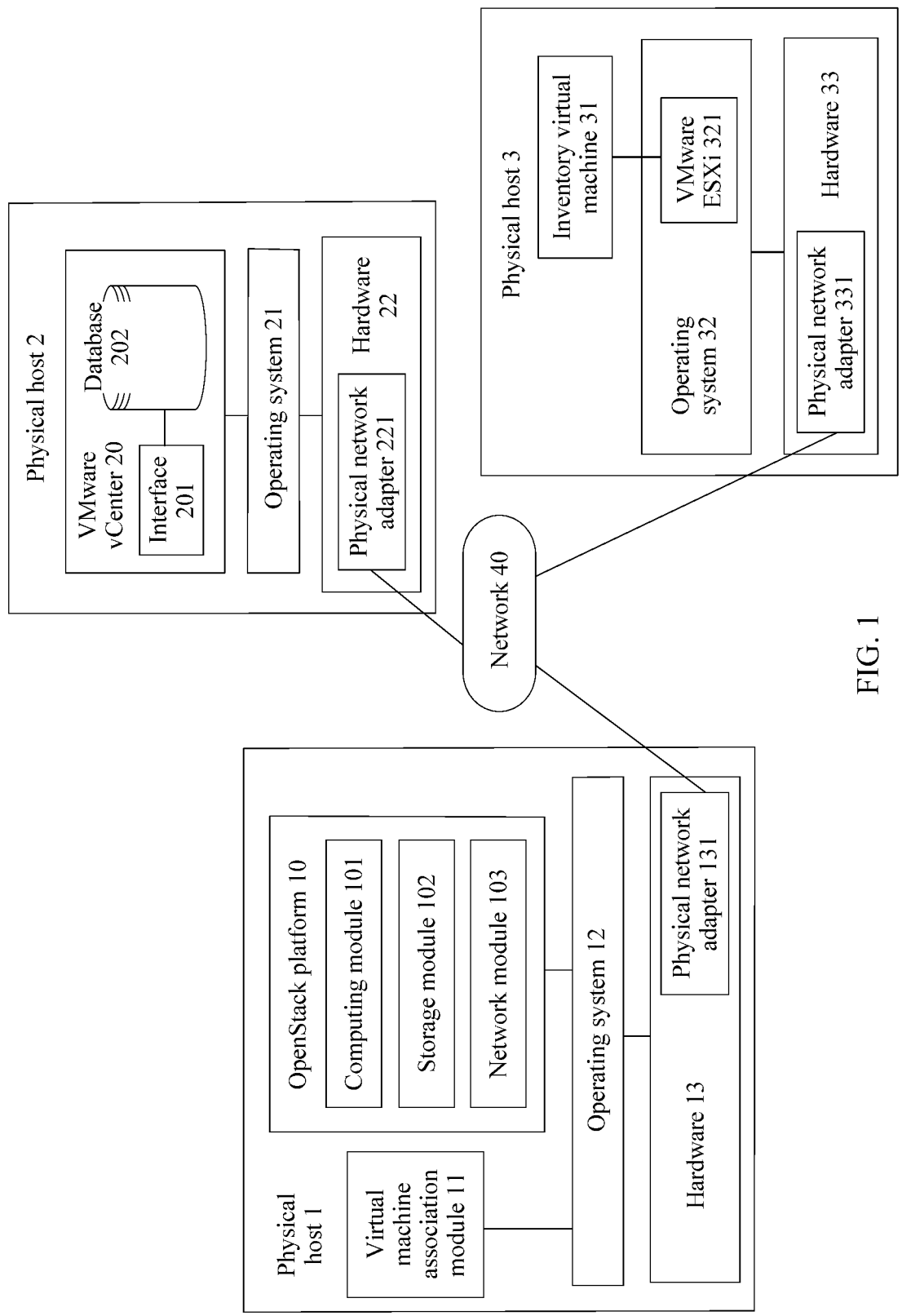
FIG. 1 is a schematic structural diagram of a virtual machine takeover system according to an embodiment of the present disclosure.

Referring to FIG. 1, FIG. 1 is a schematic structural diagram of a virtual machine takeover system according to an embodiment of the present disclosure. As shown in FIG. 1, the virtual machine takeover system according to this embodiment of the present disclosure includes a virtual machine association module 11, an OpenStack platform 10, and a VMware vSphere platform. A VMware vCenter platform includes VMware vCenter 20 and VMware ESXi 321.

In this embodiment of the present disclosure, the virtual machine association module 11, the OpenStack platform 10, the VMware vCenter 20, and the VMware ESXi 321 may be disposed on a same host or on different hosts.

In an example in FIG. 1, the virtual machine association module 11 and the OpenStack platform 10 are disposed on a physical host 1, the VMware vCenter 20 is disposed on a physical host 2, and the VMware ESXi 321 is disposed on a physical host 3.

Hardware 13 and an operating system 12 are further disposed on the physical host 1. The virtual machine association module 11 and the OpenStack platform 10 run in the operating system 12. The hardware 13 includes a physical network adapter 131, and the virtual machine association module 11 and the OpenStack platform 10 each may send or receive a packet using the physical network adapter 131. Hardware 22 and an operating system 21 are further disposed on the physical host 2. The VMware vCenter 20 runs in the operating system 21. The hardware 22 includes a physical network adapter 221, and the VMware vCenter 20 may send or receive a packet using the physical network adapter 221. Hardware 33 and an operating system 32 are further disposed on the physical host 3. The VMware ESXi 321 runs in the operating system 32, the hardware 33 includes a physical network adapter 331, and the VMware ESXi 321 may send or receive a packet using the physical network adapter 331.

In addition, using the respective physical network adapters, the physical host 1, the physical host 2, and the physical host 3 set network addresses and are connected to a network 40.

It should be noted that, FIG. 1 shows only one piece of VMware ESXi 321. However, a plurality of pieces of VMware ESXi 321 may be disposed in this embodiment of the present disclosure. One piece of VMware vCenter 20 may correspond to a plurality of pieces of VMware ESXi 321, and each piece of VMware ESXi 321 is disposed on one physical host.

In this embodiment of the present disclosure, the VMware vCenter 20 and the VMware ESXi 321 may communicate with each other using an internal command.

Figure 2:
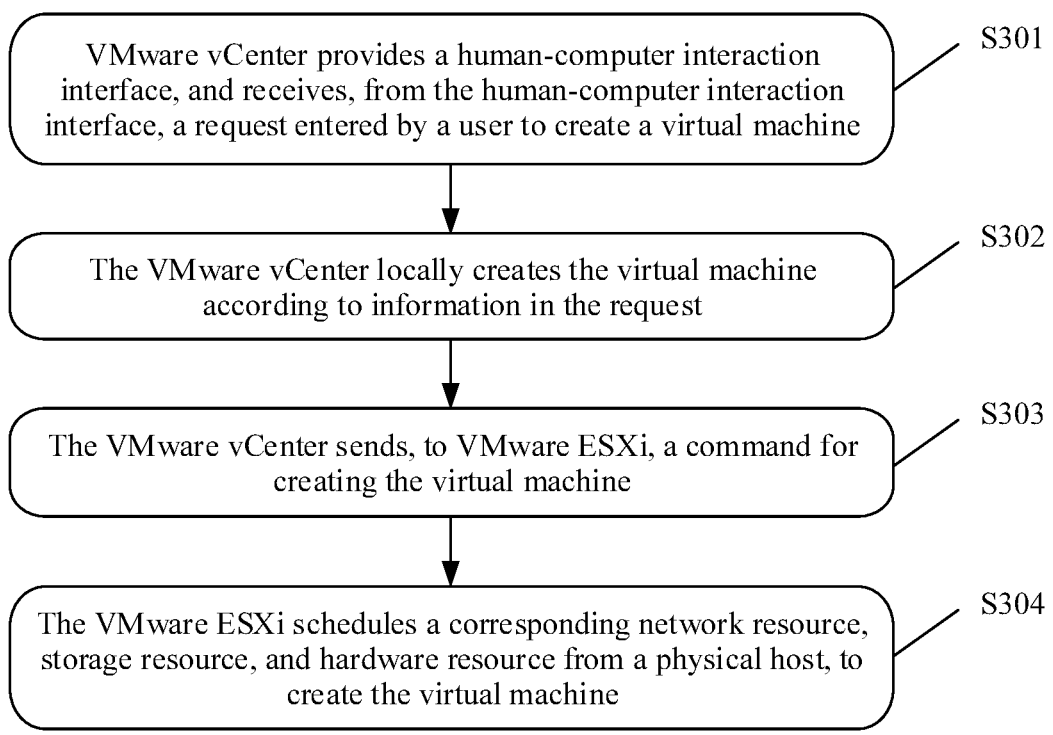
FIG. 2 is a flowchart of a method for creating an inventory virtual machine by an inventory virtual machine management node according to an embodiment of the present disclosure.

For example, FIG. 2 shows a method for creating an inventory virtual machine by an inventory virtual machine management node according to an embodiment of the present disclosure. A method for creating a virtual machine 31 by the VMware vCenter 20 includes the following steps.

Step S301: The VMware vCenter 20 provides a human-computer interaction interface, and receives, from the human-computer interaction interface, a request entered by a user to create a virtual machine. The request includes information such as a network configuration, a storage configuration, a hardware configuration, and a virtual machine name of the virtual machine that needs to be created.

The hardware configuration includes a clock rate of a processor, a quantity of processors, and a memory capacity. The storage configuration includes a volume Universally Unique Identifier (UUID), a volume name, and a volume size. The network configuration includes a port group ID, a virtual local area network ID, a port ID, an Internet Protocol (IP) address, a MAC address, a subnet ID, and a Classless Inter-Domain Routing (CIDR) network segment.

Step S302: The VMware vCenter 20 locally creates the virtual machine 31 according to the information. The step of locally creating the virtual machine 31 includes locally generating a plurality of entries of the virtual machine 31, where the plurality of entries respectively record a network resource corresponding to the network configuration, a network resource identification code of the network resource, a storage resource corresponding to the storage configuration, a storage resource identification code, the hardware configuration, and a virtual machine identification code.

Step S303: The VMware vCenter 20 sends, to VMware ESXi 321, a command for creating the virtual machine 31. The step includes: selecting, by the VMware vCenter 20, a physical host 3 that meets a condition; and sending, to the VMware ESXi 321 on the physical host 3, entries recording the network resource, the storage resource, and a hardware resource, and the virtual machine identification code.

Step S304: The VMware ESXi 321 schedules the corresponding network resource, storage resource, and hardware resource from the physical host 3, to create the virtual machine 31.

In this embodiment of the present disclosure, because the OpenStack platform manages the virtual machine 31 created by the VMware vCenter 20, the virtual machine 31 is referred to as an inventory virtual machine below, and the network resource identification code, the storage resource identification code, and the virtual machine identification code of the inventory virtual machine 31 are respectively referred to as an inventory network resource identification code, an inventory storage resource identification code, and an inventory virtual machine identification code.

Further, an interface 201 and a database 202 are disposed in the VMware vCenter 20. The database 202 is used to record the entries generated for creating the inventory virtual machine. In this embodiment of the present disclosure, the interface 201 externally discloses information such as the network configuration and the inventory network resource identification code of the inventory network resource, the storage configuration and the inventory storage resource identification code of the inventory storage resource, and the hardware configuration and the inventory virtual machine identification code of the inventory virtual machine.

In addition, the inventory virtual machine identification code, the inventory network resource identification code, and the inventory storage resource identification code of the inventory virtual machine 31 may be modified using the interface 201.

Further, the OpenStack platform 10 includes a computing module 101, a storage module 102, and a network module 103. The storage module 102 is configured to create a storage resource and generate a storage resource identification code. The network module 103 is configured to create a network resource and generate a network resource identification code. The computing module 101 is configured to create a virtual machine and generate a virtual machine identification code. It should be noted that, the computing module 101, the storage module 102, and the network module 103 are not limited to being disposed on a same physical host 1 as shown in FIG. 1. In an optional embodiment of the present disclosure, the computing module 101, the storage module 102, and the network module 103 may be separately disposed on different physical hosts.

The storage module 102 is configured to create a storage resource by: generating, in a database (which is described below in detail) of the storage module 102, an entry related to the storage resource. The network module 103 creates a network resource by: generating, in a database (which is described below in detail) of the network module 103, an entry related to the network resource. The computing module 101 creates a virtual machine by: generating, in a database (which is described below in detail) of the computing module 101, an entry related to the virtual machine.

Figure 3A:
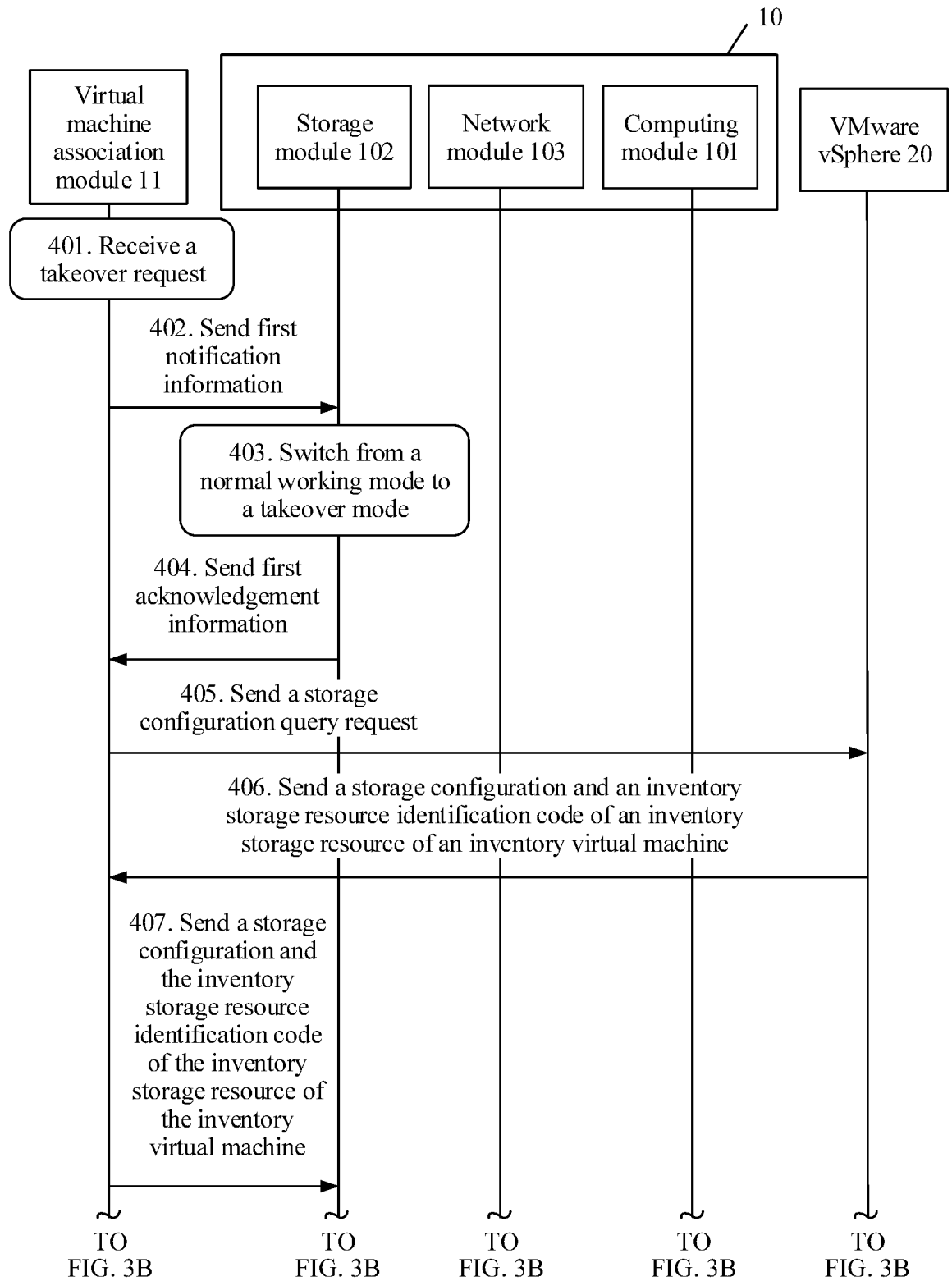
FIG. 3A, FIG. 3B, and FIG. 3C are data exchange diagrams of a takeover method according to an embodiment of the present disclosure.
Figure 3B:
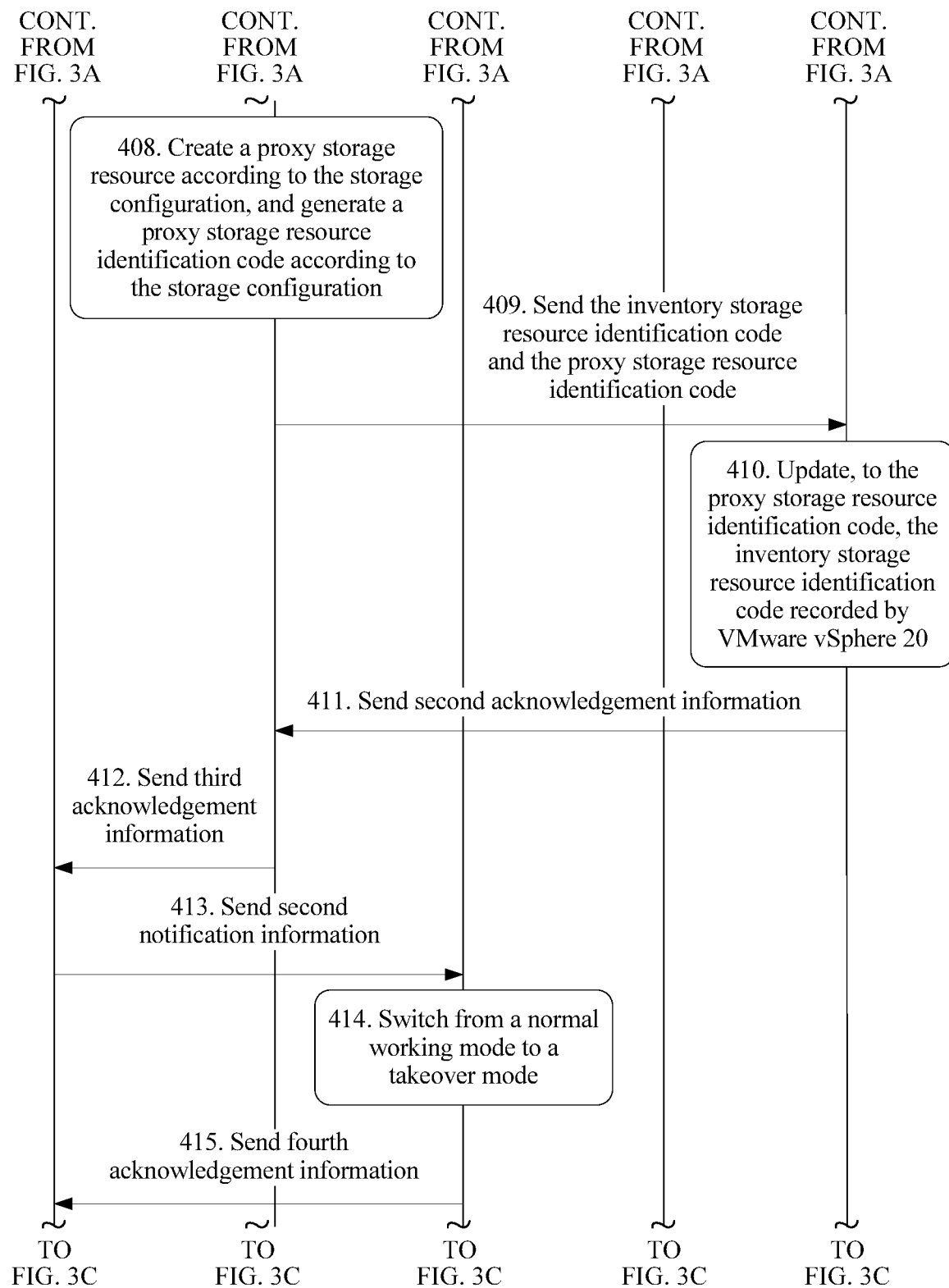
Figure 3C:
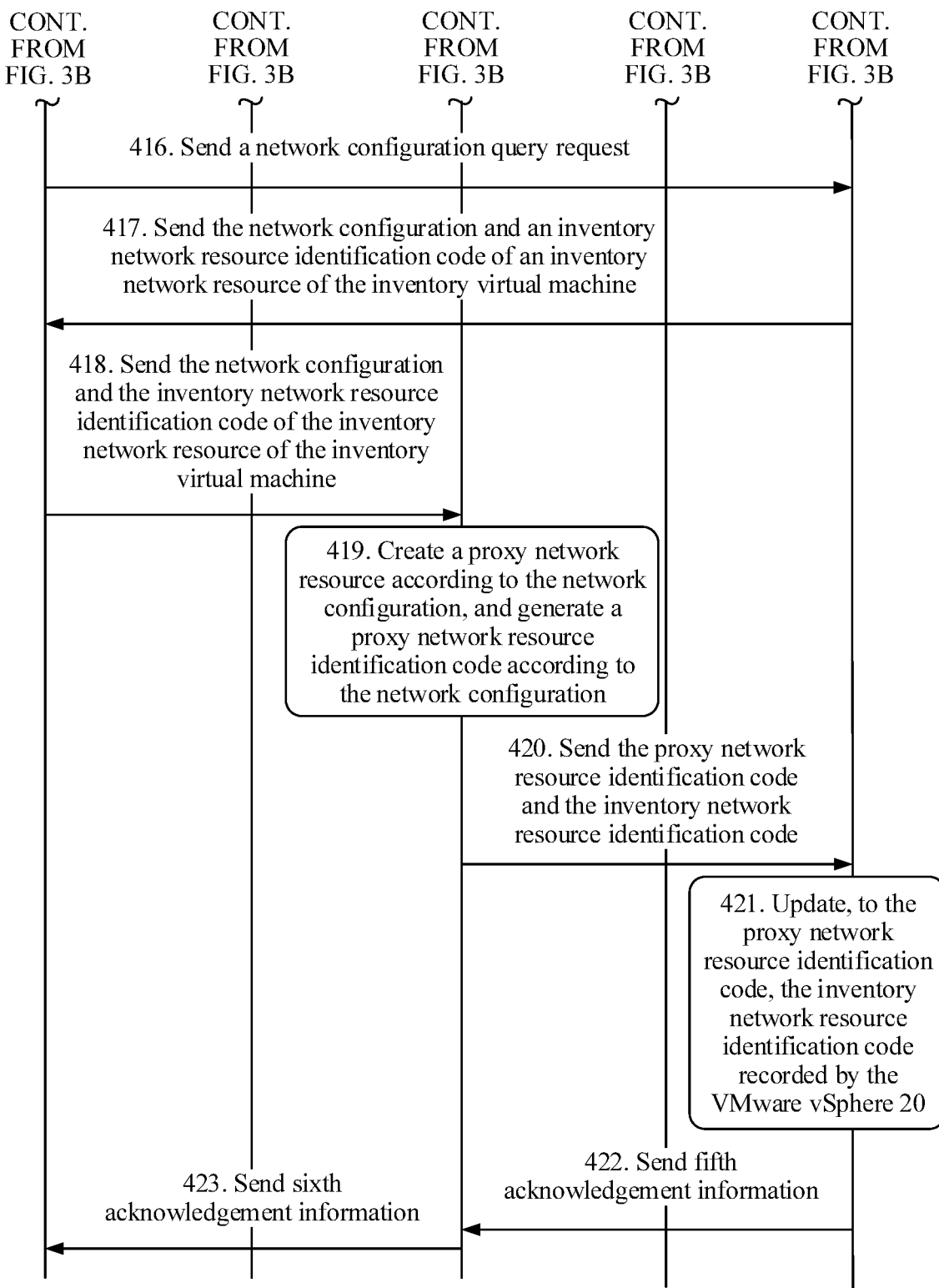

In this embodiment of the present disclosure, the virtual machine 31 managed by the VMware vCenter 20 is incorporated into the OpenStack platform 10, and the OpenStack platform 10 performs cross-platform management on the virtual machine 31. For a specific implementation thereof, refer to FIG. 3A, FIG. 3B, and FIG. 3C. FIG. 3A, FIG. 3B, and FIG. 3C are data exchange diagrams of a takeover method according to an embodiment of the present disclosure.

As shown in FIG. 3A, FIG. 3B, and FIG. 3C, the takeover method according to this embodiment of the present disclosure includes the following steps.

Step 401: A virtual machine association module 11 receives a takeover request. The takeover request includes a network address of VMware vCenter 20 and a network address of an OpenStack platform 10.

For example, the network address of the VMware vCenter 20 may be an IP address of a physical host 2 and a port of the VMware vCenter 20 in an operating system 21 of the physical host 2, and the network address of the OpenStack platform 10 may be an IP address of a physical host 1 and a port of the OpenStack platform 10 in an operating system 12. The virtual machine association module 11 may display a human-computer interaction page on the physical host 1 in a web page manner. A user enters the foregoing network addresses into an input box of the human-computer interaction page, and clicks a button "Start takeover", such that the virtual machine association module 11 receives the takeover request.

Step 402: The virtual machine association module 11 sends a first notification information to the OpenStack platform 10. The first notification information is used to instruct a storage module 102 of the OpenStack platform 10 to switch from a normal working mode to a takeover mode.

Step 403: The storage module 102 switches from the normal working mode to the takeover mode.

For example, the storage module 102 receives the first notification information, and switches from the normal working mode to the takeover mode according to the first notification information.

Figure 4:
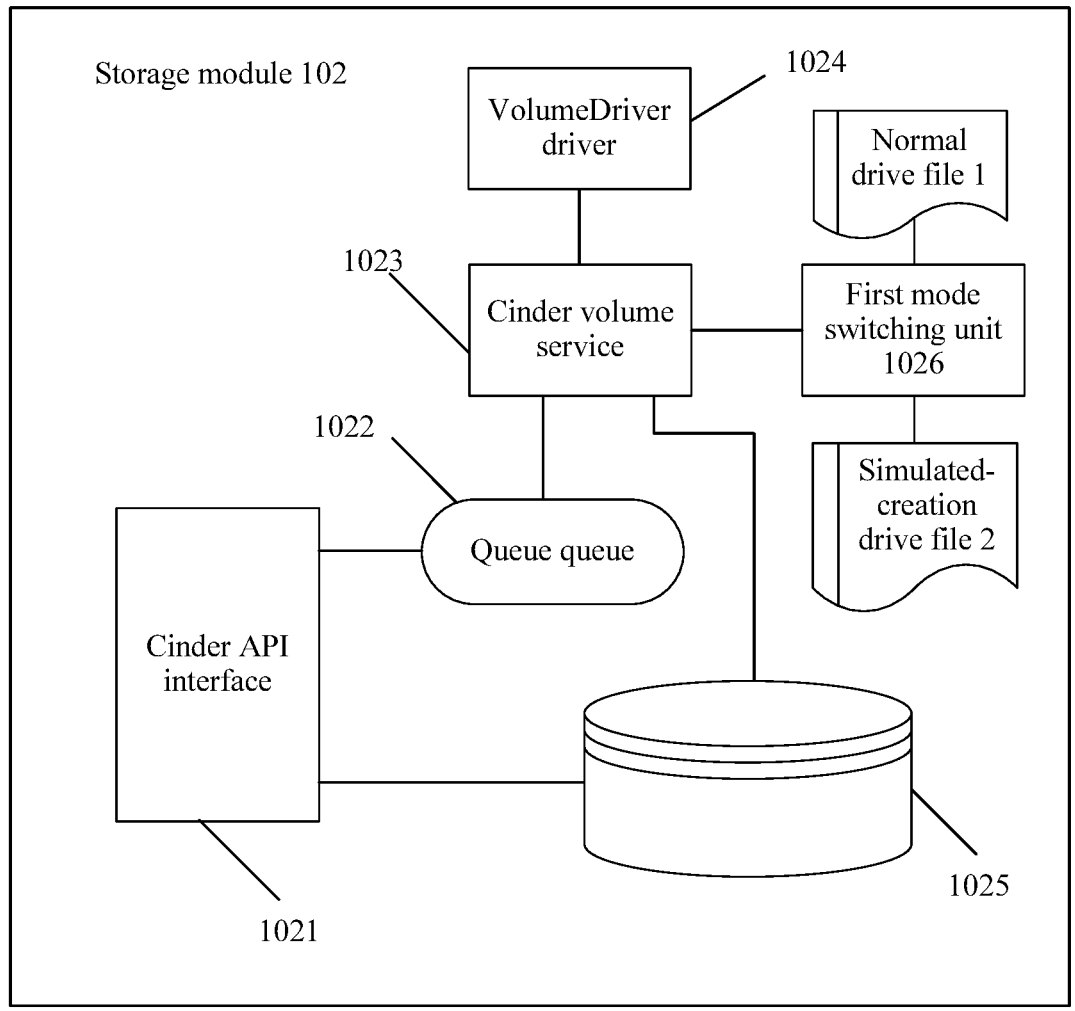
FIG. 4 is a schematic diagram of an apparatus structure of a storage node according to an embodiment of the present disclosure.

Referring to FIG. 4, a schematic diagram is shown of an apparatus structure of a storage node according to an embodiment of the present disclosure. For example, the storage module 102 may be a Cinder module, and the Cinder module includes a Cinder application programming interface (API) interface 1021, a queue 1022, a Cinder volume service 1023, a VolumeDriver driver 1024, a database 1025, and a first mode switching unit 1026.

The first mode switching unit 1026 is configured to: receive the first notification information; and modify a configuration file according to the first notification information, such that the Cinder volume service 1023 loads a simulated-creation drive file 2, in order to switch to the takeover mode.

The Cinder API interface 1021 is configured to: receive an external command; and perform reading from the database 1025 or writing to the database 1025. The Cinder API interface 1021 communicates with the Cinder volume service 1023 using the queue 1022. The Cinder volume service 1023 may load a normal drive file 1 or the simulated-creation drive file 2. The simulated-creation drive file 2 is a subclass of the normal drive file 1.

The VolumeDriver driver 1024 records the network address of the VMware vCenter 20, and may access an interface 201 of the VMware vCenter 20.

When the Cinder volume service 1023 loads the normal drive file 1, the Cinder volume service 1023 executes normal logic: according to a storage configuration received by the Cinder API interface 1021, creating a storage resource, and generating a storage resource identification code, where creating a storage resource comprises: generating an entry recording the storage resource; storing the entry in the database 1025; and sending, to computing module 101 (which is described below in detail), the storage resource identification code and the entry recording the storage resource, such that the computing module 101 may allocate the corresponding storage resource from a hardware resource pool.

When the Cinder volume service 1023 loads the simulated-creation drive file 2, the Cinder volume service 1023 executes takeover logic to perform: sending first acknowledgement information to the virtual machine association module 11 after the simulated-creation drive file 2 is loaded and the service is restarted (where the first acknowledgement information is described below in detail); according to a storage configuration received by the Cinder API interface 1021, creating a proxy storage resource; and generating a proxy storage resource identification code. Creating a proxy storage resource comprises: generating an entry recording the takeover storage resource; storing the entry in the database 1025; recording, in the database 1025, an inventory storage resource identification code received by the Cinder API interface 1021 and the generated proxy storage resource identification code; sending the proxy storage resource identification code and the inventory storage resource identification code to the VMware vCenter 20; and sending third acknowledgement information to the virtual machine association module 11 after the VolumeDriver driver 1024 receives second acknowledgement information (where the second acknowledgement information and the third acknowledgement information are described below in detail).

In this step, after receiving the first notification information, the first mode switching unit 1026 modifies the configuration file of the Cinder volume service, and controls the Cinder volume service 1023 to restart, such that the Cinder volume service 1023 loads the simulated-creation drive file. Therefore, the Cinder module 102 is controlled to switch from the normal working mode to the takeover mode.

Step 404: The OpenStack platform 10 sends first acknowledgement information to the virtual machine association module 11. The first acknowledgement information is used to notify the virtual machine association module 11 that the storage module 102 has switched to the takeover mode.

For example, after switching from the normal working mode to the takeover working mode, the storage module 102 sends the first acknowledgement information to the virtual machine association module 11.

Step 405: The virtual machine association module 11 sends a storage configuration query request to the VMware vCenter 20. The storage configuration query request is used to query, in a database 202, a storage configuration and an inventory storage resource identification code of an inventory storage resource of an inventory virtual machine 31 on the VMware vCenter 20 using an interface 201 of the VMware vCenter 20.

The storage configuration includes a volume Universally Unique Identifier (UUID), a volume name, and a volume size.

Step 406: The VMware vCenter 20 sends the storage configuration and the inventory storage resource identification code of the inventory storage resource of the inventory virtual machine to the virtual machine association module 11.

In this step, the VMware vCenter 20 queries, in the database 202, the storage configuration and the inventory storage resource identification code of the inventory storage resource of the inventory virtual machine 31 according to the storage configuration query request. Further, the VMware vCenter 20 sends a query result to the virtual machine association module 11.

Step 407: The virtual machine association module 11 sends the storage configuration and the inventory storage resource identification code of the inventory storage resource of the inventory virtual machine to the OpenStack platform 10.

In this step, the storage module 102 receives the storage configuration and the inventory storage resource identification code of the inventory storage resource of the inventory virtual machine 31 using the Cinder API interface.

Step 408: The OpenStack platform 10 creates a proxy storage resource according to the storage configuration, and generates a proxy storage identification code according to the storage configuration.

In this step, after receiving the storage configuration and the inventory storage resource identification code of the inventory storage resource of the inventory virtual machine 31, the Cinder API interface stores the inventory storage resource identification code in the database 1025, and sends the storage configuration to the queue 1022. The Cinder volume service 1023: obtains the storage configuration from the queue 1022; creates the proxy storage resource according to the storage configuration; and generates the proxy storage resource identification code according to the storage configuration. Further, creating the proxy storage resource comprises generating the entry recording the takeover storage resource; and stores, in the database 1025, the entry recording the proxy storage resource and an entry recording the proxy storage resource identification code.

Step 409: The OpenStack platform 10 sends the inventory storage resource identification code and a proxy storage resource identification code to the VMware vCenter 20.

For example, the Cinder volume service 1023 accesses the interface 201 of the VMware vCenter 20 using the VolumeDriver driver 1024, and the VolumeDriver driver 1024 enters, on the interface 201 by invoking an API of the VMware vCenter 20, a command for updating the inventory storage resource identification code to the proxy storage resource identification code.

Step 410: The VMware vCenter 20 updates, to the proxy storage resource identification code, the inventory storage resource identification code recorded by the VMware vCenter 20.

For example, after the interface 201 receives the inventory storage resource identification code and the proxy storage resource identification code that are sent by the VolumeDriver driver 1024, the VMware vCenter 20 searches the database 202 of the VMware vCenter 20 for the inventory storage resource identification code, and updates the inventory storage resource identification code to the proxy storage resource identification code.

Step 411: The VMware vCenter 20 sends second acknowledgement information to the OpenStack platform 10. The second acknowledgement information is used to notify the OpenStack platform 10 that the inventory storage resource identification code has been updated.

For example, the VMware vCenter 20 sends the second acknowledgement information to the VolumeDriver driver 1024, and the VolumeDriver driver 1024 notifies, according to the second acknowledgement information, the Cinder volume service 1023 that the VMware vCenter 20 has updated the inventory storage resource identification code.

Step 412: The OpenStack platform 10 sends third acknowledgement information to the virtual machine association module 11. The third acknowledgement information is used to notify the virtual machine association module 11 that the storage module 102 has completed a takeover function.

For example, the Cinder volume service 1023 sends the third acknowledgement information to the virtual machine association module 11, to notify the virtual machine association module 11 that the storage module 102 has completed storage resource takeover.

Step 413: The virtual machine association module 11 sends second notification information to the OpenStack platform 10. The second notification information is used to instruct a network module 103 of the OpenStack platform 10 to switch from a normal working mode to a takeover mode.

For example, the virtual machine association module 11 may send the second notification information to the network module 103 of the OpenStack platform 10.

Step 414: The network module 103 switches from the normal working mode to the takeover mode.

Figure 5:
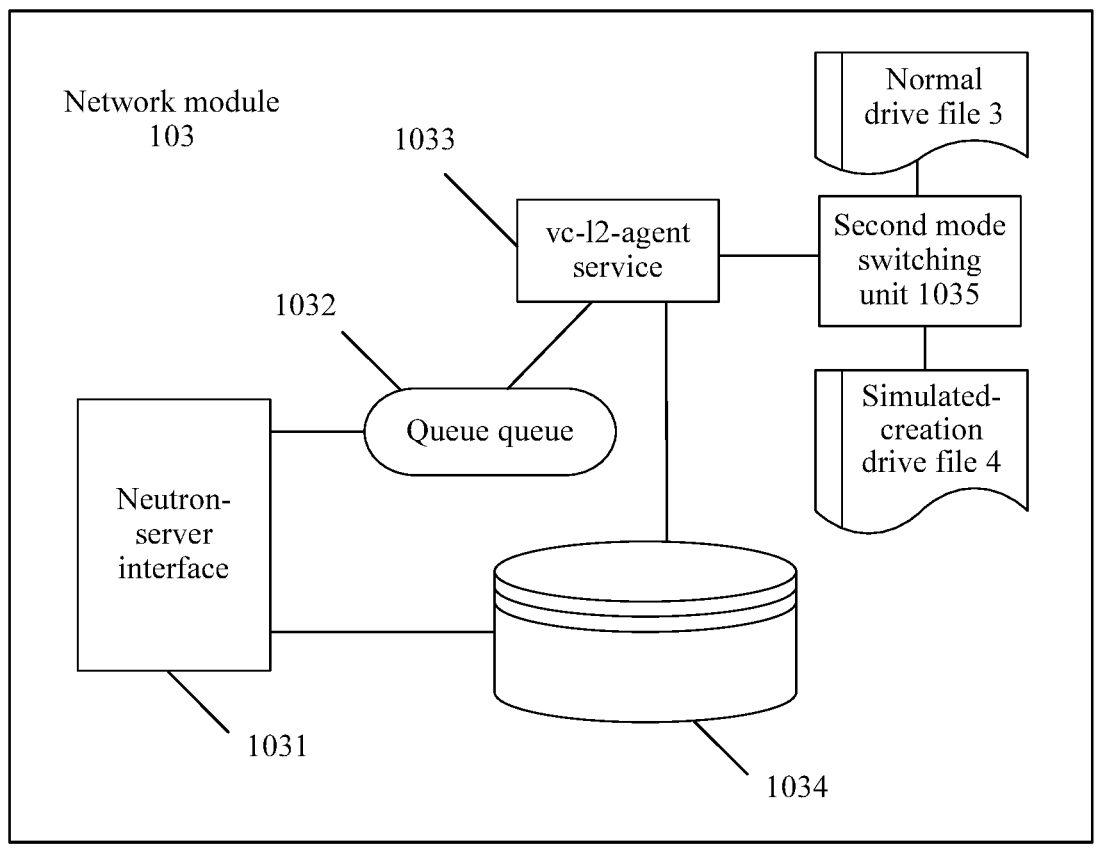
FIG. 5 is a schematic diagram of an apparatus structure of a network node according to an embodiment of the present disclosure.

Referring to FIG. 5, a schematic diagram is shown of an apparatus structure of a network node according to an embodiment of the present disclosure. For example, the network module 103 may be a Neutron module, and the Neutron module includes a Neutron-server interface 1031, a queue 1032, a vc-12-agent service 1033, a second mode switching unit 1035, and a database 1034.

The Neutron-server interface 1031 may receive an external command, and perform reading from the database 1034 or writing to the database 1034. The Neutron-server interface 1031 communicates with the vc-12-agent service 1033 using the queue 1032. The vc-12-agent service 1033 may load a normal drive file 3 or a simulated-creation drive file 4. The simulated-creation drive file 4 is a subclass of the normal drive file 3.

The vc-12-agent service 1033 records the network address of the VMware vCenter 20, and may access the interface 201 of the VMware vCenter 20.

When the vc-12-agent service 1033 loads the normal drive file 3, the vc-12-agent service 1033 executes normal Neutron service logic to perform the following operations: creating a network resource according to a network configuration received by the Neutron-server interface 1031; and generating a network resource identification code. Creating a network resource comprises: generating an entry recording the network resource; recording the entry in the database 1034; and sending, to the Nova-compute, the network resource identification code and the entry recording the network resource.

When the vc-12-agent service 1033 loads the simulated-creation drive file 4, the vc-12-agent service 1033 executes takeover logic to perform the following operations: sending fourth acknowledgement information to the virtual machine association module 11 after the simulated-creation drive file 4 is loaded (where the fourth acknowledgement information is described below in detail); creating a proxy network resource according to a network configuration received by the Neutron-server interface 1031; and generating a proxy network resource identification code. Creating a proxy network resource comprises generating an entry recording the proxy network resource; recording the entry in the database 1034; recording, in the database 1034, an inventory network resource identification code received by the Neutron-server interface 1031 and the generated proxy network resource identification code; sending the proxy network resource identification code and the inventory network resource identification code to the VMware vCenter 20; and sending sixth acknowledgement information to the virtual machine association module 11 after fifth acknowledgement information is received (where the fifth acknowledgement information and the sixth acknowledgement information are described below in detail).

The second mode switching unit 1035 is configured to: receive the second notification information; and modify a configuration file of the vc-12-agent service 1033 after the second mode switching unit 1035 receives the second notification information, such that the vc-12-agent service 1033 loads the simulated-creation drive file 4 for takeover. Therefore, the network module 103 switches from the normal working mode to the takeover working mode.

Step 415: The OpenStack platform 10 sends fourth acknowledgement information to the virtual machine association module 11. The fourth acknowledgement information is used to notify the virtual machine association module 11 that the network module 103 has switched to the takeover mode.

For example, after loading the simulated-creation drive file 4, the vc-12-agent service 1033 of the network module 103 sends the fourth acknowledgement information to the virtual machine association module 11.

Step 416: The virtual machine association module 11 sends a network configuration query request to the VMware vCenter 20. The network configuration query request is used to query, in the database 202, a network configuration and an inventory network resource identification code of an inventory network resource of the inventory virtual machine 31 on the VMware vCenter 20 using the interface 201 of the VMware vCenter 20.

The network configuration includes a port group ID, a virtual local area network ID, a port ID, an IP address, a MAC address, a subnet ID, and a Classless Inter-Domain Routing (CIDR) network segment.

Step 417: The VMware vCenter 20 sends the network configuration and the inventory network resource identification code of the inventory network resource of the inventory virtual machine to the virtual machine association module 11.

In this step, the VMware vCenter 20 queries, in the database 202, the network configuration and the inventory network resource identification code of the inventory network resource of the inventory virtual machine 31 according to the network configuration query request. Additionally, the VMware vCenter 20 sends a query result to the virtual machine association module 11.

Step 418: The virtual machine association module 11 sends the network configuration and the inventory network resource identification code of the inventory network resource of the inventory virtual machine to the OpenStack platform 10.

In this step, the virtual machine association module 11 sends the network configuration and the inventory network resource identification code of the inventory network resource of the inventory virtual machine to the Neutron-server interface 1031 of the network module 103.

Step 419: The OpenStack platform 10 creates a proxy network resource according to the network configuration, and generates a proxy network identification code according to the network configuration.

In this step, after receiving the network configuration and the inventory network resource identification code of the inventory network resource of the inventory virtual machine, the Neutron-server interface 1031 stores the inventory network resource identification code in the database 1034, and sends the network configuration to the queue 1032. The vc-12-agent service 1033: obtains the network configuration from the queue 1032; creates the proxy network resource according to the network configuration; and generates the proxy network resource identification code according to the network configuration. Creating the proxy network resource comprises generating the entry recording the takeover network resource; and storing, in the database 1025, the entry recording the proxy network resource and an entry recording the proxy network resource identification code.

Step 420: The OpenStack platform 10 sends the inventory network resource identification code and the proxy network resource identification code to the VMware vCenter 20.

For example, the vc-12-agent service 1033 accesses the interface 201 of the VMware vCenter 20, and enters, on the interface 201 by invoking the API of the VMware vCenter 20, a command for updating the inventory network resource identification code to the proxy network resource identification code.

Step 421: The VMware vCenter 20 updates, to the proxy network resource identification code, the inventory network resource identification code recorded by the VMware vCenter 20.

For example, after the interface 201 receives the inventory network resource identification code and the proxy network resource identification code that are sent by the vc-12-agent service 1033, the VMware vCenter 20 searches the database 202 of the VMware vCenter 20 for the inventory network resource identification code, and updates the inventory network resource identification code to the proxy network resource identification code.

Step 422: The VMware vCenter 20 sends fifth acknowledgement information to the OpenStack platform 10. The fifth acknowledgement information is used to notify the OpenStack platform 10 that the inventory network resource identification code has been updated.

For example, the VMware vCenter 20 sends the fifth acknowledgement information to the vc-12-agent service 1033, and the vc-12-agent service 1033 learns, according to the fifth acknowledgement information, that the inventory network resource identification code of the VMware vCenter 20 has been updated.

Step 423: The OpenStack platform 10 sends sixth acknowledgement information to the virtual machine association module 11. The sixth acknowledgement information is used to notify the virtual machine association module 11 that the network module 103 has completed a takeover function.

For example, the vc-12-agent service 1033 sends the sixth acknowledgement information to the virtual machine association module 11, to notify the virtual machine association module 11 that the network module 103 has completed the takeover function.

Figure 6A:
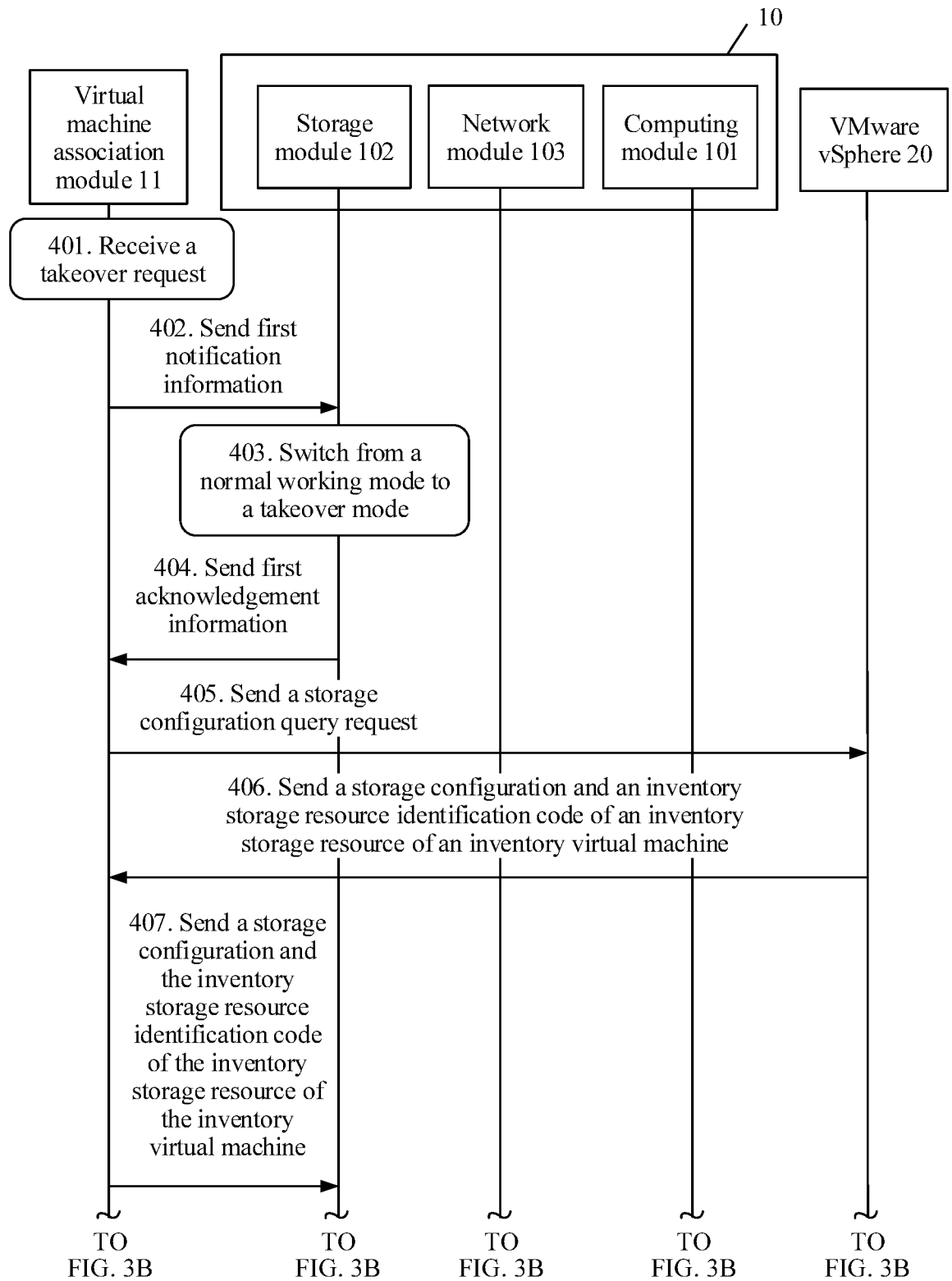
FIG. 6A, FIG. 6B, and FIG. 6C are data exchange diagrams of a takeover method according to another embodiment of the present disclosure.
Figure 6B:
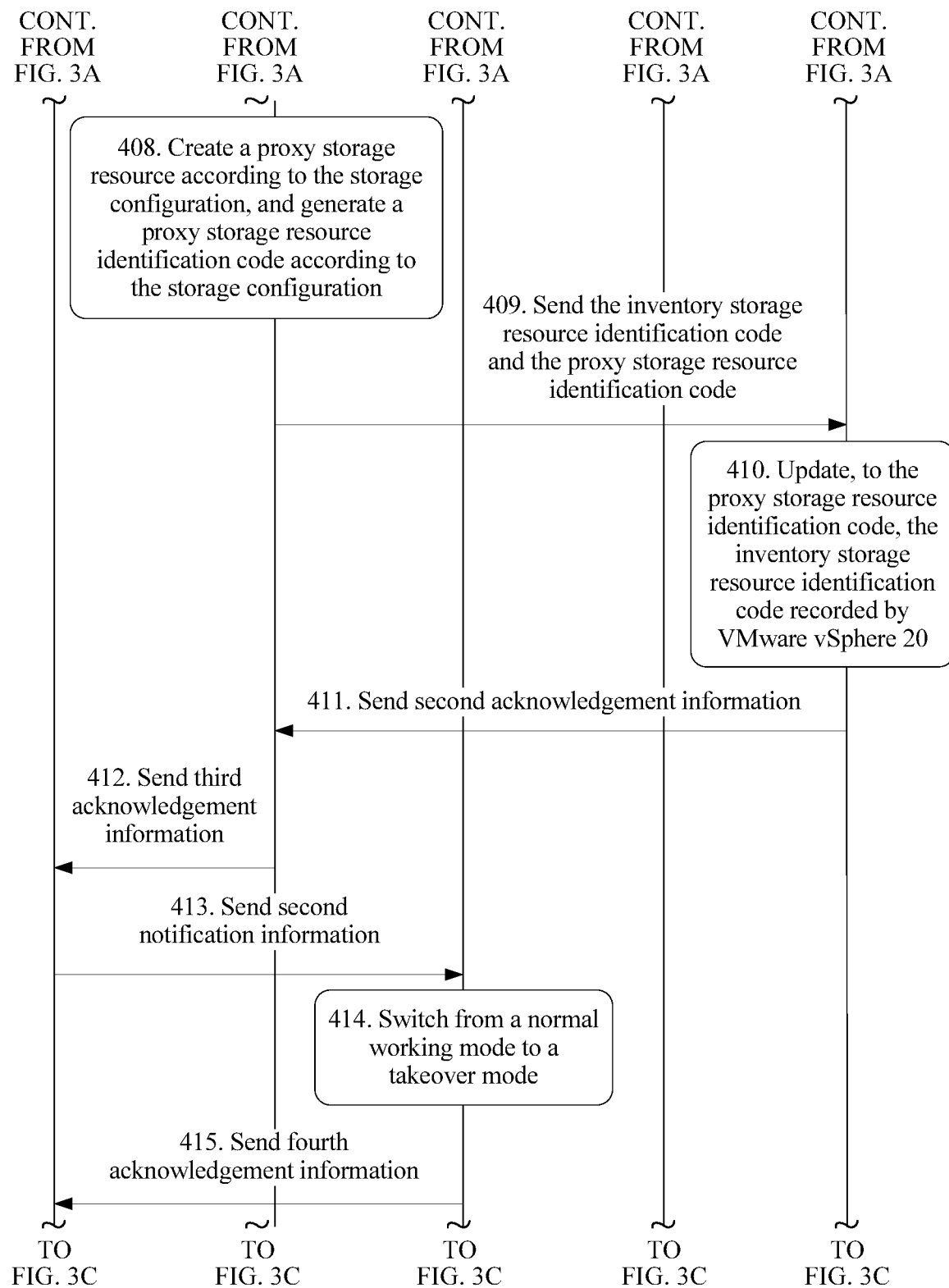
Figure 6C:
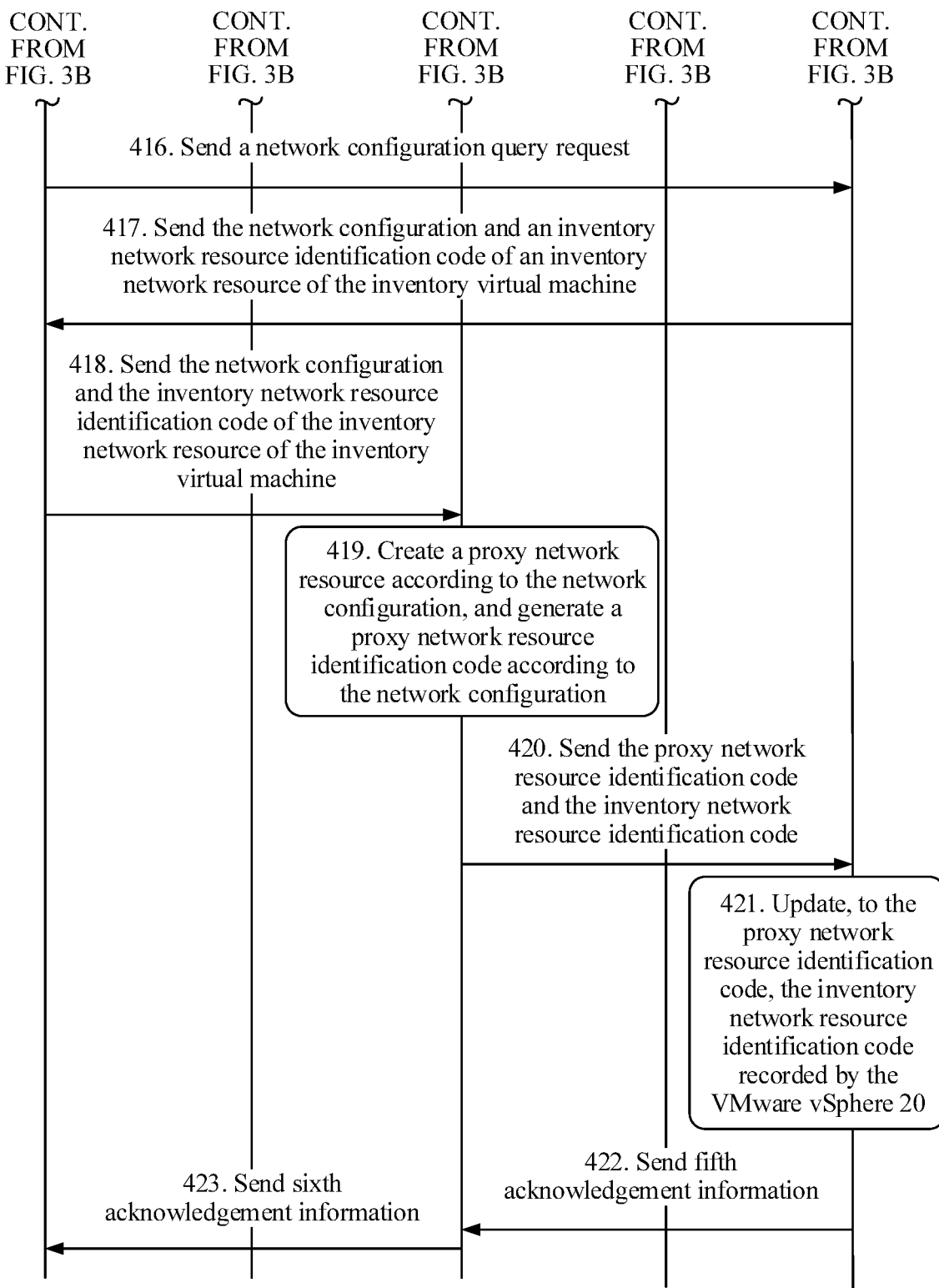

In the following, referring to FIG. 6A, FIG. 6B, and FIG. 6C, FIG. 6A, FIG. 6B, and FIG. 6C are continuations of FIG. 3A, FIG. 3B, and FIG. 3C, and are other data exchange diagrams of the takeover method according to this embodiment of the present disclosure.

As shown in FIG. 6A, FIG. 6B, and FIG. 6C, the takeover method according to this embodiment of the present disclosure further includes the following steps.

Step 424: The virtual machine association module 11 sends third notification information to the OpenStack platform 10. The third notification information is used to instruct a computing module 101 of the OpenStack platform 10 to switch from a normal working mode to a takeover mode.

For example, the virtual machine association module 11 may send the third notification information to the computing module 101 of the OpenStack platform 10.

Step 425: The computing module 101 switches from the normal working mode to the takeover mode.

Figure 7:
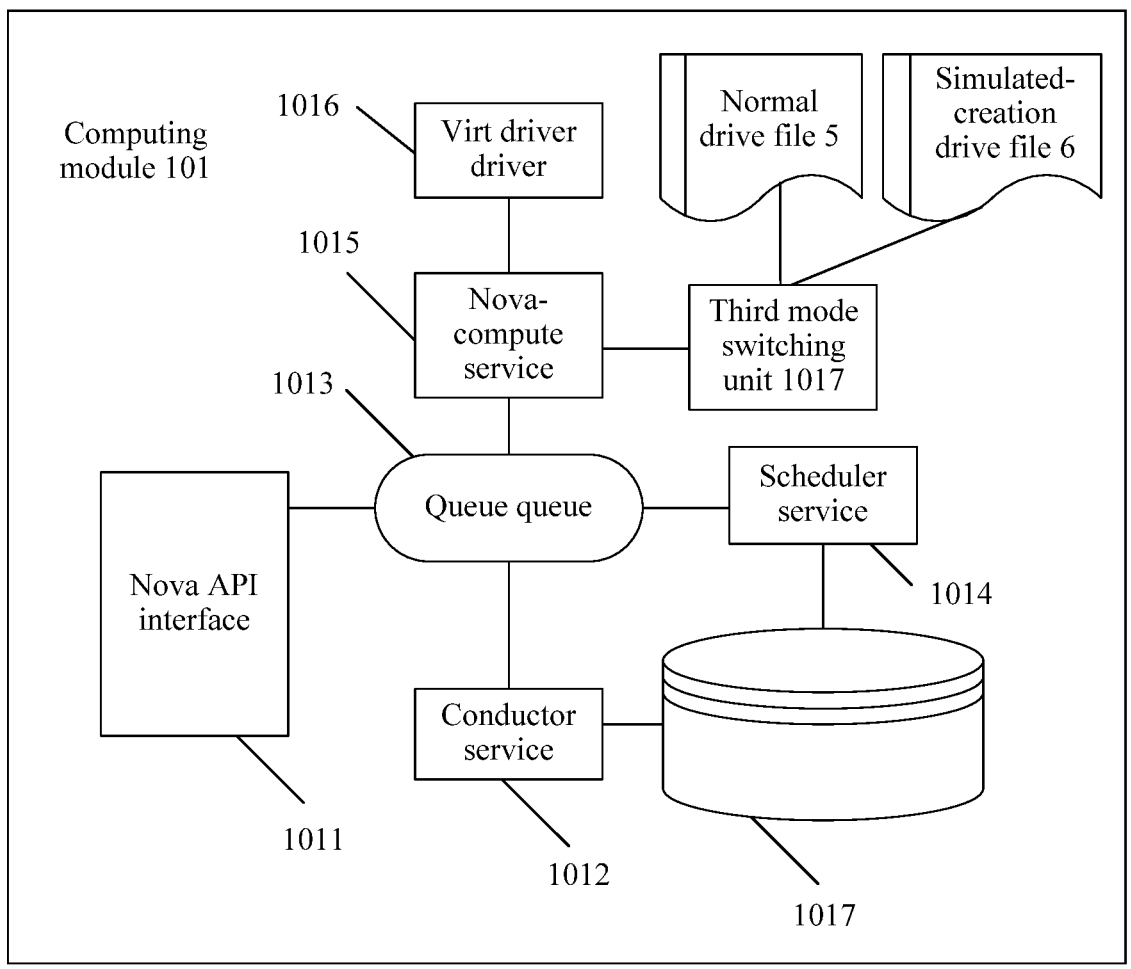
FIG. 7 is a schematic diagram of an apparatus structure of a computing node according to an embodiment of the present disclosure.

Referring to FIG. 7, FIG. 7 is a schematic diagram of an apparatus structure of a computing node according to an embodiment of the present disclosure. For example, the network module 103 may be a Nova module, and the Neutron module includes a Nova API interface 1011, a queue 1013, a Nova-compute service 1015, a scheduler service 1014, a conductor service 1012, a database 1017, a Virt driver 1016, and a third mode switching unit 1018.

The Nova API interface 1011 may receive an external command, convert the external command into an internal command, and send the internal command to the queue 1013. The conductor service 1012, the Nova-compute service 1015, and the scheduler service 1014 communicate with each other using the queue 1013.

The conductor service 1012 performs reading from the database 1017 or writing to the database 1034.

The database 1017 records information about the hardware resource pool. The hardware resource pool includes a plurality of physical hosts on which virtual machine managers are disposed. The information about the hardware resource pool includes network addresses, hardware configurations, network configurations, and storage configurations of the plurality of physical hosts.

The scheduler service 1014 selects, according to hardware resource pool data recorded in the database 1017, a network address of a physical host on which a virtual machine is appropriate to be created.

The Nova-compute service 1015 is configured to create and manage a virtual machine.

The Virt driver 1016 records the network address of the VMware vCenter 20, and the Nova-compute service 1015 may access the interface 201 of the VMware vCenter 20 using the Virt driver 1016.

The Nova-compute service 1015 may load a normal drive file 5 or a simulated-creation drive file 6. The simulated-creation drive file is a subclass of the normal drive file.

When the Nova-compute service 1015 loads the normal drive file 5, the Nova-compute service 1015 executes normal Nova service logic to perform the following operations: obtaining, from the queue 1013, a hardware configuration received by the Nova API interface 1011; obtaining the network resource identification code from the Neutron module 103; obtaining the storage resource identification code from the storage module 102; creating a virtual machine according to the hardware configuration, the network resource corresponding to the network resource identification code, and the storage resource corresponding to the storage resource identification code; and generating a virtual machine identification code. Creating a virtual machine comprises: generating an entry recording the virtual machine; recording the entry in the database 1017; and sending, to a virtual machine monitor, the virtual machine identification code, the entry recording the virtual machine, the entry recording the network resource, and the entry recording the storage resource, such that the virtual machine monitor allocates a corresponding resource from a local resource pool according to the virtual machine identification code, the network resource, the storage resource, and the hardware configuration, to create the virtual machine, and the created virtual machine is recognized on the OpenStack platform 10 using the virtual machine identification code.

When the Nova-compute service 1015 loads the simulated-creation drive file 6, the Nova-compute service 1015 executes takeover logic to perform the following operations: sending seventh acknowledgement information to the virtual machine association module 11 after the simulated-creation drive file 6 is loaded (where the seventh acknowledgement information is described below in detail); obtaining, from the queue 1013, a hardware configuration and an inventory virtual machine identification code that are received by the Nova API interface 1011; obtaining the proxy network resource identification code from the Neutron module 103; obtaining the proxy storage resource identification code from the storage module 102; creating, according to the hardware configuration, the proxy network resource identification code, and the proxy storage resource identification code, a virtual machine in which the takeover network resource, the takeover storage resource, and the hardware configuration are configured; and generating a proxy virtual machine identification code. Creating a virtual machine comprises generating an entry recording the virtual machine; recording the entry in the database 1017; recording, in the database 1017, the inventory virtual machine identification code received by the Nova API interface 1011 and the generated proxy virtual machine identification code; sending the proxy virtual machine identification code and the inventory virtual machine identification code to the VMware vCenter 20; and sending ninth acknowledgement information to the virtual machine association module 11 after eighth acknowledgement information is received (where the eighth acknowledgement information and the ninth acknowledgement information are described below in detail).

In this step, the third mode switching unit 1017 is configured to: receive the third notification information; and modify a configuration file of the Nova-compute service 1015 when receiving the third notification information, such that the Nova-compute service 1015 loads the simulated-creation drive file 6 for takeover. Therefore, the computing module 101 switches from the normal working mode to the takeover working mode.

Step 426: The OpenStack platform 10 sends seventh acknowledgement information to the virtual machine association module 11. The seventh acknowledgement information is used to notify the virtual machine association module 11 that the computing module 101 has switched to the takeover mode.

For example, after loading the simulated-creation drive file, the computing module 101 sends the seventh acknowledgement information to the virtual machine association module 11.

Step 427: The virtual machine association module 11 sends a virtual machine query request to the VMware vCenter 20. The virtual machine query request is used to query, in the database 202, a hardware configuration and an inventory virtual machine identification code of the inventory virtual machine 31 on the VMware vCenter 20 using the interface 201 of the VMware vCenter 20.

The hardware configuration includes a clock rate of a processor, a quantity of processors, and a memory capacity.

Step 428: The VMware vCenter 20 sends the hardware configuration and the inventory virtual machine identification code of the inventory virtual machine to the virtual machine association module 11.

In this step, the VMware vCenter 20 queries, in the database 202, the hardware configuration and the inventory virtual machine identification code of the inventory virtual machine 31 according to the virtual machine query request, and sends a query result to the virtual machine association module 11.

Step 429: The virtual machine association module 11 sends the hardware configuration and the inventory virtual machine identification code of the inventory virtual machine to the OpenStack platform 10.

In this step, the virtual machine association module 11 sends the hardware configuration and the inventory virtual machine identification code of the inventory virtual machine to the Nova API interface 1011 of the computing module 101.

Step 430: According to the hardware configuration, the proxy network resource identification code, and the proxy storage resource identification code, the OpenStack platform 10 creates a virtual machine in which the takeover network resource, the takeover storage resource, and the hardware configuration are configured, and generates a proxy virtual machine identification code.

In this step, after receiving the hardware configuration and the inventory virtual machine identification code of the inventory virtual machine, the Nova API interface 1011 stores the inventory virtual machine identification code in the database 1017, and sends the hardware configuration to the queue 1013. The Nova-compute service 1015: obtains the hardware configuration from the queue 1013, obtains the proxy storage resource identification code from the storage module 102, and obtains the proxy network resource identification code from the network module 103; creates, according to the hardware configuration, the proxy network resource identification code, and the proxy storage resource identification code, the virtual machine in which the takeover network resource, the takeover storage resource, and the hardware configuration are configured; and generates the proxy virtual machine identification code. The Nova-compute service 1015 creates the virtual machine by generating the entry recording the virtual machine, and recording, in the database 1017, the entry recording the virtual machine and an entry recording the proxy virtual machine identification code.

Step 431: The OpenStack platform 10 sends the inventory virtual machine identification code and the proxy virtual machine identification code to the VMware vCenter 20.

For example, the Nova-compute service 1015 accesses the interface 201 of the VMware vCenter 20 using the Virt driver 1016, and enters, on the interface 201 by invoking the API of the VMware vCenter 20, a command for updating the inventory virtual machine identification code to the proxy virtual machine identification code.

Step 432: The VMware vCenter 20 updates, to the proxy virtual machine identification code, the inventory virtual machine identification code recorded by the VMware vCenter 20.

For example, after the interface 201 receives the inventory virtual machine identification code and the proxy virtual machine identification code that are sent by the Virt driver 1016, the VMware vCenter 20 searches the database 202 of the VMware vCenter 20 for the inventory virtual machine identification code, and updates the inventory virtual machine identification code to the proxy virtual machine identification code.

Step 433: The VMware vCenter 20 sends eighth acknowledgement information to the OpenStack platform 10. The eighth acknowledgement information is used to notify the OpenStack platform 10 that the inventory virtual machine identification code has been updated.

In some implementations, the VMware vCenter 20 sends the eighth acknowledgement information to the Virt driver 1016, and the Virt driver 1016 notifies, according to the eighth acknowledgement information, the Nova-compute service 1015 that the inventory virtual machine identification code of the VMware vCenter 20 has been updated.

Step 434: The OpenStack platform 10 sends ninth acknowledgement information to the virtual machine association module 11. The ninth acknowledgement information is used to notify the virtual machine association module 11 that the computing module 101 has completed a takeover function.

In some implementations, the Nova-compute sends the ninth acknowledgement information to the virtual machine association module 11, to notify the virtual machine association module 11 that the computing module 101 has completed the takeover function.

Step 435: After receiving the ninth acknowledgement information, the virtual machine association module 11 sends fourth notification information to the OpenStack platform 10, where the fourth notification information is used to instruct the storage module 102 of the OpenStack platform 10 to switch to the normal working mode.

For example, the virtual machine association module 11 sends the fourth notification information to the first mode switching unit 1026 of the storage module 102.

Step 436: The OpenStack platform 10 switches from the takeover mode to the normal working mode.

In some implementations, the first mode switching unit 1026 is configured to: receive the fourth notification information; and modify the configuration file of the Cinder volume service 1023 according to the fourth notification information, such that the Cinder volume service 1023 loads the normal drive file 1, and the Cinder volume service 1023 is controlled to restart. Therefore, the Cinder volume service 1023 runs logic of the normal drive file 1, in order to switch from the takeover mode to the normal working mode.

Step 437: The OpenStack platform 10 sends tenth acknowledgement information to the virtual machine association module 11, where the tenth acknowledgement information is used to notify the virtual machine association module 11 that the storage module 102 has switched to the normal working mode.

In some implementations, the Cinder volume service 1023 sends the tenth acknowledgement information to the virtual machine association module 11.

Step 438: The virtual machine association module 11 sends fifth notification information to the OpenStack platform 10, where the fifth notification information is used to instruct the network module 103 of the OpenStack platform 10 to switch to the normal working mode.

In some implementations, the virtual machine association module 11 sends the fifth notification information to the second mode switching unit 1035 of the network module 103.

Step 439: The network module 103 switches from the takeover mode to the normal working mode.

In some implementations, the second mode switching unit 1035 is configured to: receive the fifth notification information; and modify the configuration file of the vc-12-agent service 1033 according to the fifth notification information, such that the vc-12-agent service 1033 loads the normal drive file, and the vc-12-agent service 1033 is controlled to restart. Therefore, the vc-12-agent service 1033 runs logic of the normal drive file 3, in order to switch from the takeover mode to the normal working mode.

Step 440: The OpenStack platform 10 sends eleventh acknowledgement information to the virtual machine association module 11. The eleventh acknowledgement information is used to notify the virtual machine association module 11 that the network module 103 has switched to the normal working mode.

In some implementations, the vc-12-agent service 1033 sends the eleventh acknowledgement information to the virtual machine association module 11.

Step 441: The virtual machine association module 11 sends sixth notification information to the OpenStack platform 10, where the sixth notification information is used to instruct the computing module 101 of the OpenStack platform 10 to switch to the normal working mode.

For example, the virtual machine association module 11 sends the sixth notification information to the third mode switching unit 1017 of the computing module 101.

Step 442: The computing module 101 switches from the takeover mode to the normal working mode.

In some implementations, the third mode switching unit 1017 is configured to: receive the sixth notification information; and modify the configuration file of the Nova-compute service 1015 according to the sixth notification information, such that the Nova-compute service 1015 loads the normal drive file 5, and the Nova-compute service 1015 is controlled to restart. Therefore, the Nova-compute service 1015 runs logic of the normal drive file 5, in order to switch from the takeover mode to the normal working mode.

Step 443: The OpenStack platform 10 sends twelfth acknowledgement information to the virtual machine association module 11. The twelfth acknowledgement information is used to notify the virtual machine association module 11 that the computing module 101 has switched to the normal working mode.

In some implementations, the Nova-compute service 1015 sends the twelfth acknowledgement information to the virtual machine association module 11.

Step 444: The virtual machine association module 11 displays that takeover is completed.

In this step, the virtual machine association module 11 determines, according to the tenth acknowledgement information, the eleventh acknowledgement information, and the twelfth acknowledgement information, that the computing module 101, the storage module 102, and the network module 103 each switch to the normal working mode. Therefore, a takeover process is completed, and a display page may be set, such that the user learns that the takeover is completed.

In conclusion, in this embodiment of the present disclosure, a first cloud management platform creates a proxy virtual machine and a proxy virtual machine identification code according to configuration information obtained from a second cloud management platform, and sends the proxy virtual machine identification code to the second cloud management platform, such that the second cloud management platform updates an inventory virtual machine identification code to the proxy virtual machine identification code. During subsequent maintenance, only the proxy virtual machine identification code and a corresponding management command need to be entered on the first cloud management platform, and the first cloud management platform sends the proxy virtual machine identification code and the corresponding management command to the second cloud management platform, such that the first cloud management platform can manage an inventory virtual machine managed by the second cloud management platform. Therefore, cross-platform automated management on a virtual machine can be implemented.

In addition, because the VMware vCenter 20 records the proxy virtual machine identification code through updating, the OpenStack platform 10 may manage the inventory virtual machine 31 of the VMware vCenter 20 by managing the virtual machine identification code.

Figure 8:
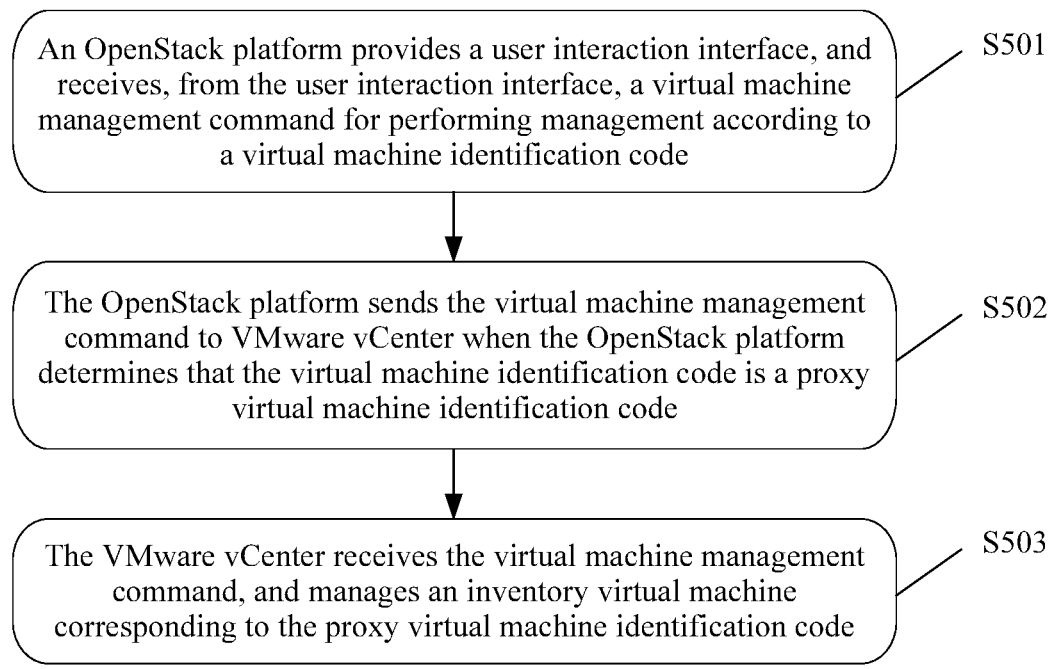
FIG. 8 is a flowchart of managing an inventory virtual machine by an OpenStack platform according to an embodiment of the present disclosure.

For ease of understanding, referring to FIG. 8, a flowchart is shown of managing an inventory virtual machine by an OpenStack platform according to an embodiment of the present disclosure. A method for managing an inventory virtual machine 31 by an OpenStack platform 10 is as follows.

Step S501: The OpenStack platform 10 provides a user interaction interface, and receives, from the user interaction interface, a virtual machine management command for performing management according to a virtual machine identification code.

For example, the OpenStack platform 10 provides a command-line interface (CLI). A user executes a Nova delete command on the CLI of the OpenStack platform 10. In the Nova delete command, a proxy virtual machine identification code of the OpenStack platform 10 is used as an input parameter. A Nova-compute service 1015 sends the Nova delete command to a Virt driver 1016.

Step S502: The OpenStack platform 10 sends the virtual machine management command to VMware vCenter 20 when the OpenStack platform 10 determines that the virtual machine identification code is a proxy virtual machine identification code. The virtual machine management command carries the proxy virtual machine identification code.

Step S503: The VMware vCenter 20 receives the virtual machine management command, and manages an inventory virtual machine corresponding to the proxy virtual machine identification code.

For example, the Virt driver 1016 invokes an API that is of the VMware vCenter 20 and that is configured to delete a virtual machine, and transmits, to an interface 201 of the VMware vCenter 20, a deletion request in which the proxy virtual machine identification code is used as a parameter. The VMware vCenter 20 receives the deletion request, and sends an internal command to VMware ESXi 321, to instruct the VMware ESXi 321 to delete the inventory virtual machine 31.

Based on the foregoing method, operations such as creating, startup, shutdown, hibernation, wakeup, suspension, restart, and migration may be further performed on the inventory virtual machine 31. Details are not described herein.

After an inventory virtual machine identification code recorded by the VMware vCenter 20 is updated to the proxy virtual machine identification code, because the VMware vCenter 20 can recognize the proxy virtual machine identification code, during subsequent maintenance, only the command for performing management according to the proxy virtual machine identification code needs to be entered on the OpenStack platform. The OpenStack platform forwards the command to the VMware vCenter 20, such that the OpenStack platform can perform entire-period management on the inventory virtual machine managed by the VMware vCenter 20. Therefore, in this embodiment of the present disclosure, cross-platform automated management on a virtual machine can be implemented, and it is convenient to carry out subsequent maintenance.

It should be noted that, the foregoing virtual machine association module 11 may be used as a component of the OpenStack platform 10, or may be used as third-party software independent of the OpenStack platform 10. This is not limited in the embodiments of the present disclosure.

Figure 9:
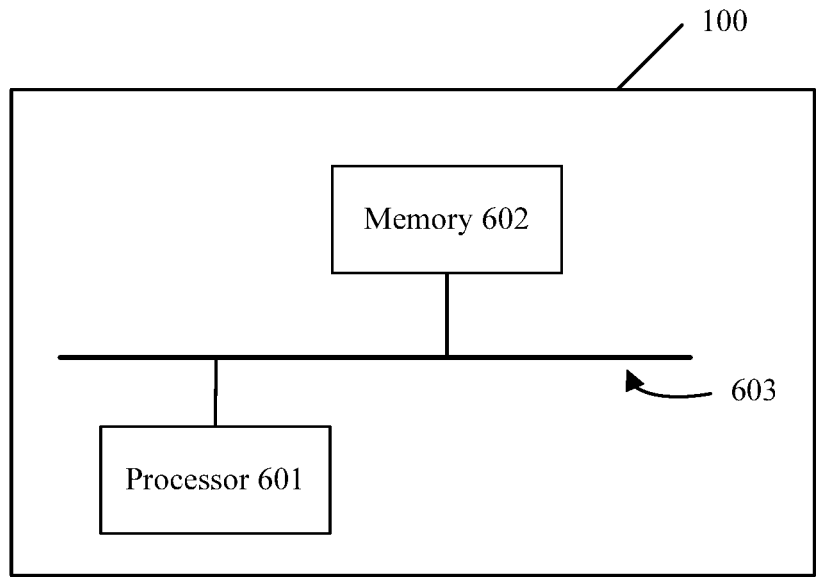
FIG. 9 is a schematic diagram of an apparatus structure of a host according to an embodiment of the present disclosure.

An embodiment of the present disclosure further discloses a host. For details, refer to FIG. 9, which is a schematic diagram of an apparatus structure of a host 100 according to an embodiment of the present disclosure. As shown in FIG. 9, the host 100 includes a processor 601, a memory 602, and a bus 603. Both the processor 601 and the memory 602 are connected to the bus 603, the memory 602 stores a program instruction, and the processor 601 executes the program instruction to perform the foregoing method performed by a first cloud management platform.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded or executed on a computer, all or some of the procedures or functions according to the embodiments of the present disclosure are generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), or a semiconductor medium. The semiconductor medium may be a solid state disk (SSD).

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application without departing from the scope of the present disclosure.

It may be clearly understood by a person skilled in the art that, for the purpose of convenient and brief description, for a detailed working process of the foregoing system, apparatus, and units, refer to a corresponding process in the foregoing method embodiments. Details are not described herein again.

Figure 10A:
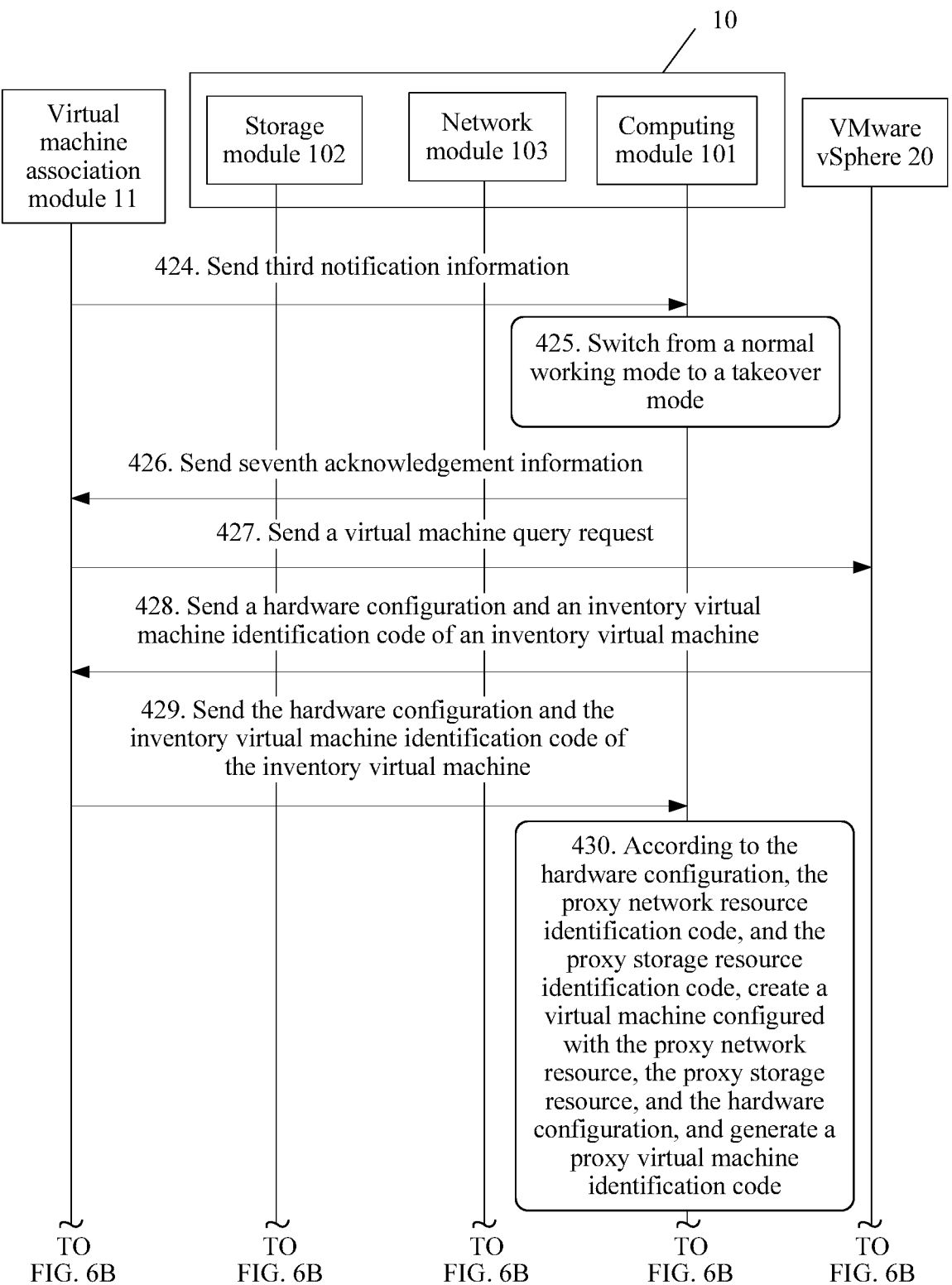
FIG. 10A, FIG. 10B, and FIG. 10C are data exchange diagrams of a takeover method according to another embodiment of the present disclosure.
Figure 10B:
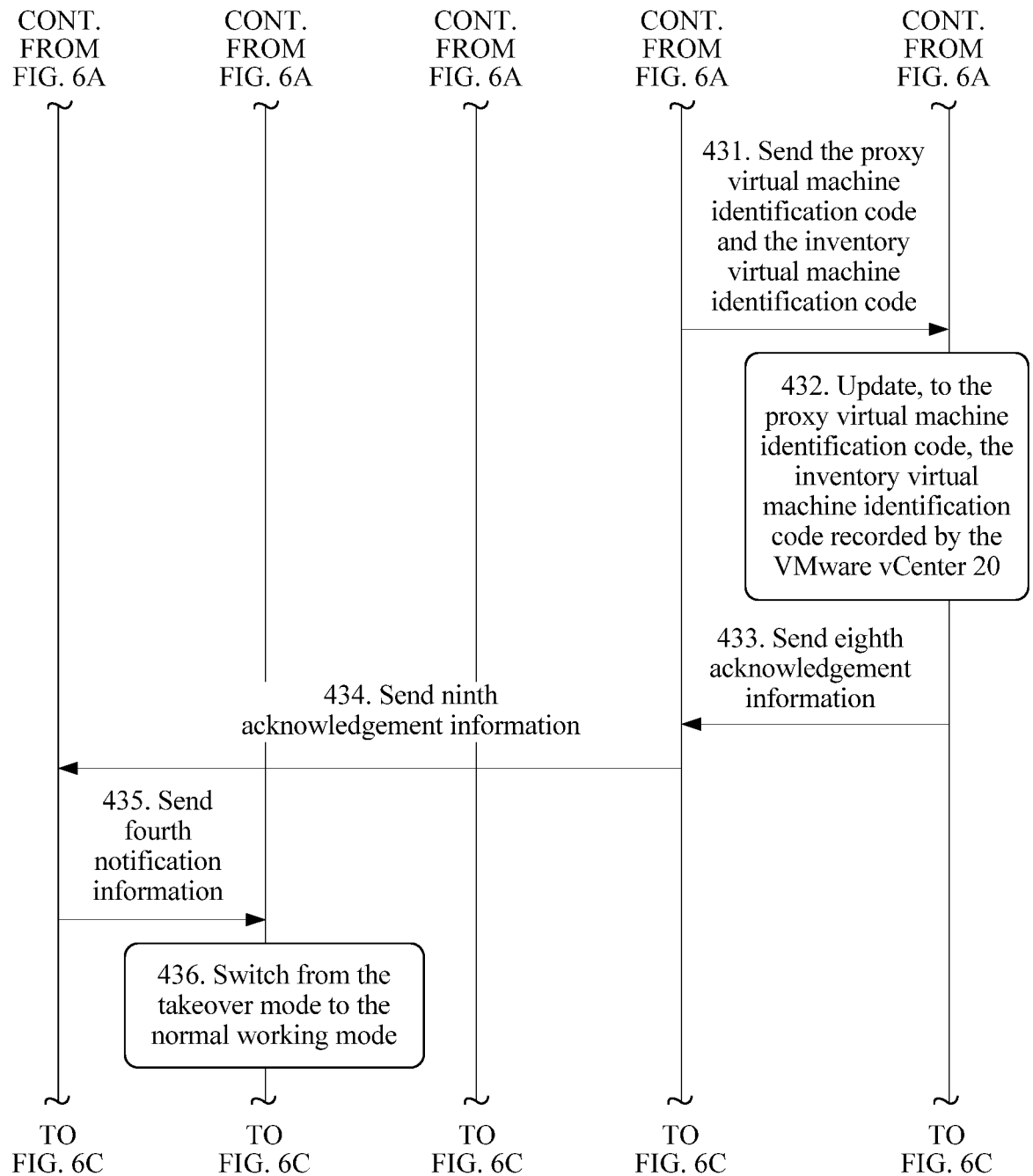
Figure 10C:
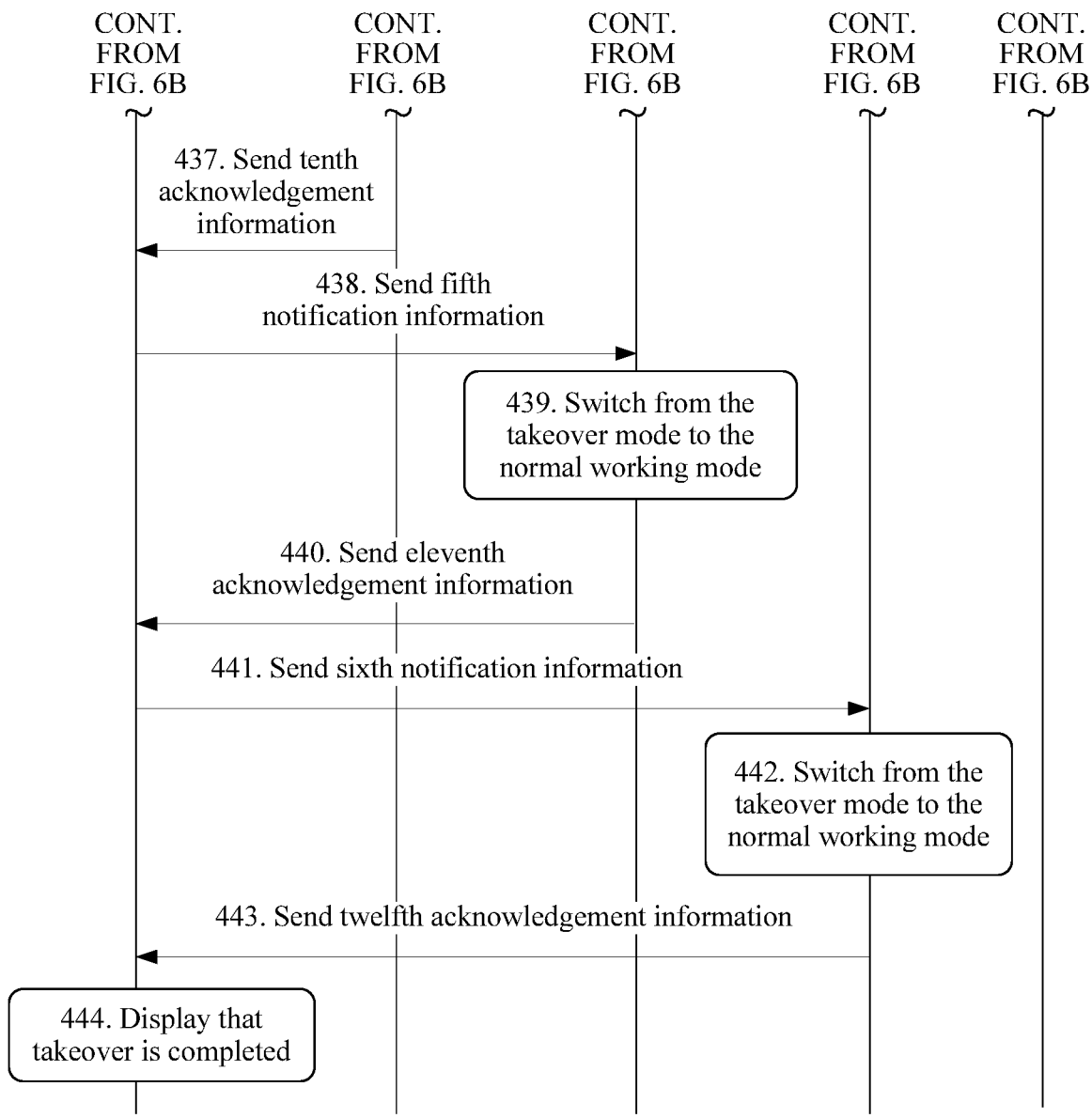

Referring to FIG. 10A, FIG. 10B, and FIG. 10C, data exchange diagrams are shown of a takeover method according to another embodiment of the present disclosure. FIG. 10A, FIG. 10B, and FIG. 10C make supplements for the step 424 to step 444 described above. Electively, in the step 410 described above, VMware vCenter 20 records a relationship between the inventory virtual machine identification code and the proxy virtual machine identification code directly. In the step 421 described above, VMware vCenter 20 records a relationship between the inventory network resource identification code and the proxy network resource identification code directly. In the step 432 described above, VMware vCenter 20 records a relationship between the inventory storage resource identification code and the proxy storage resource identification code directly. Because the relationship between the inventory virtual machine identification code and the proxy virtual machine identification code is recorded by VMware vCenter 20 (this is different from embodiment of FIG. 3 and FIG. 6 in which the inventory virtual machine identification code is updated to the proxy virtual machine identification code), after receiving the proxy virtual machine identification code, VMware vCenter 20 acquires the inventory virtual machine identification code corresponding to the proxy virtual machine identification code by querying the relationship between the inventory virtual machine identification code and the proxy virtual machine identification code, and confirms which virtual machine to be managed by the inventory virtual machine identification code, in order to manage a virtual machine.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected according to actual requirements to achieve the objectives of the solutions in the embodiments.

The foregoing descriptions are merely example implementations of the present disclosure, but are not intended to limit the protection scope of the present disclosure. Any person skilled in the art may figure out a variation or a replacement of the disclosed implementations without departing from the scope of the present application.

What is claimed is:

1. A virtual machine management method, comprising:
    obtaining, by a first cloud management platform, configuration information of an inventory virtual machine from a second cloud management platform, wherein the first cloud management platform and the second cloud management platform are different types of cloud management platforms;
    locally creating, by the first cloud management platform, a proxy virtual machine according to the configuration information of the inventory virtual machine;
    generating a proxy virtual machine identification code according to the configuration information of the inventory virtual machine, wherein the proxy virtual machine identification code is to identify the proxy virtual machine on the first cloud management platform;
    sending, by the first cloud management platform, the proxy virtual machine identification code to the second cloud management platform; and
    updating, by the second cloud management platform to the proxy virtual machine identification code, an inventory virtual machine identification code recorded by the second cloud management platform.

2. The virtual machine management method according to claim 1, wherein the configuration information comprises a hardware configuration and the inventory virtual machine identification code of the inventory virtual machine, and wherein locally creating, by the first cloud management platform, the proxy virtual machine and generating the proxy virtual machine identification code comprises:
    creating, by the first cloud management platform, a proxy network resource;
    generating a proxy network resource identification code to identify the proxy network resource on the first cloud management platform;
    creating, by the first cloud management platform, a proxy storage resource;
    generating a proxy storage resource identification code to identify the proxy storage resource on the first cloud management platform;
    querying, by a virtual machine association module on the second cloud management platform, the hardware configuration and the inventory virtual machine identification code of the inventory virtual machine that are recorded by the second cloud management platform, wherein the inventory virtual machine identification code is to identify the inventory virtual machine on the second cloud management platform;
    sending, by the virtual machine association module, the hardware configuration and the inventory virtual machine identification code to the first cloud management platform;
    creating, by the first cloud management platform according to the hardware configuration, the proxy network resource identification code, and the proxy storage resource identification code, the proxy virtual machine; and
    generating the proxy virtual machine identification code.

3. The virtual machine management method according to claim 2, wherein sending the proxy virtual machine identification code to the second cloud management platform comprises sending, by the first cloud management platform, the proxy virtual machine identification code and the inventory virtual machine identification code to the second cloud management platform.

4. The virtual machine management method according to claim 2, wherein the configuration information further comprises a network configuration and an inventory network resource identification code of an inventory network resource of the inventory virtual machine, and wherein creating, by the first cloud management platform, the proxy network resource and generating the proxy network resource identification code comprises:
    querying, by the virtual machine association module on the second cloud management platform, the network configuration and the inventory network resource identification code of the inventory network resource, wherein the inventory network resource identification code is to identify the inventory network resource of the inventory virtual machine on the second cloud management platform;
    sending, by the virtual machine association module, the network configuration and the inventory network resource identification code to the first cloud management platform;
    creating, by the first cloud management platform, the proxy network resource according to the network configuration;
    generating the proxy network resource identification code according to the network configuration;
    sending, by the first cloud management platform, the proxy network resource identification code and the inventory network resource identification code to the second cloud management platform; and
    updating, by the second cloud management platform to the proxy network resource identification code, the inventory network resource identification code recorded by the second cloud management platform.

5. The virtual machine management method according to claim 2, wherein the configuration information further comprises a storage configuration and an inventory storage resource identification code of an inventory storage resource of the inventory virtual machine, and wherein creating, by the first cloud management platform, the proxy storage resource and generating the proxy storage resource identification code comprises:
    querying, by the virtual machine association module on the second cloud management platform, the storage configuration and the inventory storage resource identification code of the inventory storage resource, wherein the inventory storage resource identification code is to identify the inventory storage resource of the inventory virtual machine on the second cloud management platform;

sending, by the virtual machine association module, the storage configuration and the inventory storage resource identification code to the first cloud management platform;

creating, by the first cloud management platform, the proxy storage resource according to the storage configuration;

generating the proxy storage resource identification code according to the storage configuration;

sending, by the first cloud management platform, the proxy storage resource identification code and the inventory storage resource identification code to the second cloud management platform; and updating, by the second cloud management platform to the proxy storage resource identification code, the inventory storage resource identification code recorded by the second cloud management platform.

6. The virtual machine management method according to claim 2, wherein the hardware configuration comprises a clock rate of a processor, a quantity of processors, and a memory capacity, wherein the configuration information further comprises a storage configuration and a network configuration, wherein the storage configuration comprises a volume universally unique identifier (UUID), a volume name, and a volume size, and wherein the network configuration comprises a port group Identifier (ID), a virtual local area network ID, a port ID, an Internet Protocol (IP) address, a medium access control (MAC) address, a subnet ID, and a classless inter-domain routing (CIDR) network segment.

7. The virtual machine management method according to claim 1, further comprising:

providing, by the first cloud management platform, a user interaction interface;

receiving, from the user interaction interface, a virtual machine management command for performing management according to a virtual machine identification code;

sending, by the first cloud management platform, the virtual machine management command to the second cloud management platform when the first cloud management platform determines that the virtual machine identification code is the proxy virtual machine identification code, wherein the virtual machine management command carries the proxy virtual machine identification code;

receiving, by the second cloud management platform, the virtual machine management command; and managing the inventory virtual machine corresponding to the proxy virtual machine identification code.

8. A first cloud management platform, comprising:

a processor; and a memory coupled to the processor, wherein the memory comprises a plurality of execution instructions stored thereon, that when executed by the processor, cause the processor to:

obtain configuration information of an inventory virtual machine from a second cloud management platform, wherein the first cloud management platform and the second cloud management platform are different types of cloud management platforms;

locally create a proxy virtual machine according to the configuration information of the inventory virtual machine;

generate a proxy virtual machine identification code according to the configuration information of the inventory virtual machine, wherein the proxy virtual machine identification code is to identify the proxy virtual machine on the first cloud management platform; and send the proxy virtual machine identification code to the second cloud management platform.

9. The first cloud management platform according to claim 8, wherein the configuration information comprises a hardware configuration and an inventory virtual machine identification code of the inventory virtual machine, and wherein the plurality of execution instructions, when executed by the processor, cause the processor to be configured to:

create a proxy network resource, and generate a proxy network resource identification code used to identify the proxy network resource on the first cloud management platform;

create a proxy storage resource, and generate a proxy storage resource identification code used to identify the proxy storage resource on the first cloud management platform;

receive, by the first cloud management platform, the hardware configuration and the inventory virtual machine identification code of the inventory virtual machine that are sent by a virtual machine association module, wherein the hardware configuration and the inventory virtual machine identification code of the inventory virtual machine are obtained by the virtual machine association module from the second cloud management platform through querying, and the inventory virtual machine identification code is used to identify the inventory virtual machine on the second cloud management platform; and create the proxy virtual machine, and generate the proxy virtual machine identification code, according to the hardware configuration, the proxy network resource identification code, and the proxy storage resource identification code.

10. The first cloud management platform according to claim 9, wherein the plurality of execution instructions, when executed by the processor, cause the processor to be configured to send the proxy virtual machine identification code and the inventory virtual machine identification code to the second cloud management platform.

11. The first cloud management platform according to claim 9, wherein the configuration information further comprises a network configuration and an inventory network resource identification code of an inventory network resource of the inventory virtual machine, and wherein the plurality of execution instructions, when executed by the processor, cause the processor to be configured to:

receive the network configuration and the inventory network resource identification code from the virtual machine association module, wherein the network configuration and the inventory network resource identification code are obtained by the virtual machine association module from the second cloud management platform through querying, and wherein the inventory network resource identification code recorded by the second cloud management platform is to identify the inventory network resource of the inventory virtual machine on the second cloud management platform;

create the proxy network resource according to the network configuration;

generate the proxy network resource identification code according to the network configuration; and send, by the first cloud management platform, the proxy network resource identification code and the inventory network resource identification code to the second cloud management platform.

12. The first cloud management platform according to claim 9, wherein the configuration information further comprises a storage configuration and an inventory storage resource identification code of an inventory storage resource of the inventory virtual machine, and wherein the plurality of execution instructions, when executed by the processor, cause the processor to be configured to:

receive the storage configuration and the inventory storage resource identification code of the inventory storage resource of the inventory virtual machine, wherein the storage configuration and the inventory storage resource identification code of the inventory storage resource are obtained by the virtual machine association module from the second cloud management platform through querying;

create the proxy storage resource according to the storage configuration;

generate the proxy storage resource identification code according to the storage configuration; and send the proxy storage resource identification code and the inventory storage resource identification code to the second cloud management platform.

13. The first cloud management platform according to claim 8, wherein the plurality of execution instructions, when executed by the processor, cause the processor to be configured to:

provide a user interaction interface;

receive, from the user interaction interface, a virtual machine management command for performing management according to a virtual machine identification code; and send the virtual machine management command to the second cloud management platform when the first cloud management platform determines that the virtual machine identification code is the proxy virtual machine identification code, wherein the virtual machine management command carries the proxy virtual machine identification code.

14. A virtual machine management method, comprising:

obtaining, by a first cloud management platform, configuration information of an inventory virtual machine from a second cloud management platform, wherein the first cloud management platform and the second cloud management platform are different types of cloud management platforms;

locally creating, by the first cloud management platform, a proxy virtual machine according to the configuration information of the inventory virtual machine;

generating a proxy virtual machine identification code according to the configuration information of the inventory virtual machine, wherein the proxy virtual machine identification code is to identify the proxy virtual machine on the first cloud management platform;

sending, by the first cloud management platform, the proxy virtual machine identification code to the second cloud management platform; and recording, by the second cloud management platform, a relationship between an inventory virtual machine identification code recorded by the second cloud management platform and the proxy virtual machine identification code.

15. The virtual machine management method according to claim 14, wherein the configuration information comprises a hardware configuration and the inventory virtual machine identification code of the inventory virtual machine, and wherein locally creating, by the first cloud management platform, the proxy virtual machine and generating the proxy virtual machine identification code comprises:

creating, by the first cloud management platform, a proxy network resource;

generating a proxy network resource identification code to identify the proxy network resource on the first cloud management platform;

creating, by the first cloud management platform, a proxy storage resource;

generating a proxy storage resource identification code to identify the proxy storage resource on the first cloud management platform;

querying, by a virtual machine association module on the second cloud management platform, the hardware configuration and the inventory virtual machine identification code of the inventory virtual machine, wherein the inventory virtual machine identification code is to identify the inventory virtual machine on the second cloud management platform;

sending, by the virtual machine association module, the hardware configuration and the inventory virtual machine identification code to the first cloud management platform;

creating, by the first cloud management platform according to the hardware configuration, the proxy network resource identification code, and the proxy storage resource identification code, the proxy virtual machine; and generating the proxy virtual machine identification code.

16. The virtual machine management method according to claim 15, wherein sending, by the first cloud management platform, the proxy virtual machine identification code to the second cloud management platform comprises sending, by the first cloud management platform, the proxy virtual machine identification code and the inventory virtual machine identification code to the second cloud management platform.

17. The virtual machine management method according to claim 15, wherein the configuration information further comprises a network configuration and an inventory network resource identification code of an inventory network resource of the inventory virtual machine, and wherein creating, by the first cloud management platform, the proxy network resource and generating the proxy network resource identification code comprises:

querying, by the virtual machine association module on the second cloud management platform, the network configuration and the inventory network resource identification code of the inventory network resource of the inventory virtual machine, wherein the inventory network resource identification code is to identify the inventory network resource of the inventory virtual machine on the second cloud management platform;

sending, by the virtual machine association module, the network configuration and the inventory network resource identification code to the first cloud management platform;

creating, by the first cloud management platform, the proxy network resource according to the network configuration;

generating the proxy network resource identification code according to the network configuration;

sending, by the first cloud management platform, the proxy network resource identification code and the inventory network resource identification code to the second cloud management platform; and recording, by the second cloud management platform, a relationship between the inventory network resource identification code and the proxy network resource identification code.

18. The virtual machine management method according to claim 15, wherein the configuration information further comprises a storage configuration and an inventory storage resource identification code of an inventory storage resource of the inventory virtual machine, and wherein creating, by the first cloud management platform, the proxy storage resource and generating the proxy storage resource identification code comprises:

querying, by the virtual machine association module on the second cloud management platform, the storage configuration and the inventory storage resource identification code of the inventory storage resource, wherein the inventory storage resource identification code is to identify the inventory storage resource of the inventory virtual machine on the second cloud management platform;

sending, by the virtual machine association module, the storage configuration and the inventory storage resource identification code to the first cloud management platform;

creating, by the first cloud management platform, the proxy storage resource according to the storage configuration;

generating the proxy storage resource identification code according to the storage configuration;

sending, by the first cloud management platform, the proxy storage resource identification code and the inventory storage resource identification code to the second cloud management platform; and recording, by the second cloud management platform, a relationship between the inventory storage resource identification code and the proxy storage resource identification code.

19. The virtual machine management method according to claim 15, wherein the hardware configuration comprises a clock rate of a processor, a quantity of processors, and a memory capacity, wherein the configuration information further comprises a storage configuration and a network configuration, wherein the storage configuration comprises a volume universally unique identifier (UUID), a volume name, and a volume size, and the network configuration comprises a port group identifier (ID), a virtual local area network ID, a port ID, an Internet Protocol (IP) address, a medium access control (MAC) address, a subnet ID, and a classless inter-domain routing (CIDR) network segment.

20. The virtual machine management method according to claim 14, further comprising:

providing, by the first cloud management platform, a user interaction interface;

receiving, from the user interaction interface, a virtual machine management command for performing management according to a virtual machine identification code;

sending, by the first cloud management platform, the virtual machine management command to the second cloud management platform when the first cloud management platform determines that the virtual machine identification code is the proxy virtual machine identification code, wherein the virtual machine management command carries the proxy virtual machine identification code;

receiving, by the second cloud management platform, the virtual machine management command; and managing the inventory virtual machine corresponding to the proxy virtual machine identification code.

\* \* \* \* \*